(12) United States Patent
Asahara et al.

(10) Patent No.: US 10,255,114 B2
(45) Date of Patent: Apr. 9, 2019

(54) ABNORMALITY DETECTION APPARATUS, CONTROL METHOD, AND PROGRAM

(71) Applicant: NEC Corporation, Minato-ku, Tokyo (JP)

(72) Inventors: Masato Asahara, Tokyo (JP); Kazuyo Narita, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 533 days.

(21) Appl. No.: 14/900,718

(22) PCT Filed: Mar. 6, 2014

(86) PCT No.: PCT/JP2014/055844
§ 371 (c)(1),
(2) Date: Dec. 22, 2015

(87) PCT Pub. No.: WO2014/208139
PCT Pub. Date: Dec. 31, 2014

(65) Prior Publication Data
US 2016/0132359 A1 May 12, 2016

(30) Foreign Application Priority Data

Jun. 28, 2013 (JP) .................................. 2013-136427

(51) Int. Cl.
*H04L 12/24* (2006.01)
*G06F 9/50* (2006.01)
(Continued)

(52) U.S. Cl.
CPC .......... *G06F 9/5083* (2013.01); *G06F 9/5088* (2013.01); *G06F 11/3419* (2013.01);
(Continued)

(58) Field of Classification Search
CPC .. G06F 9/5083; G06F 9/5088; G06F 11/3419; G06F 11/3452; G06F 2209/508; H04L 43/50; H04L 67/10
(Continued)

(56) References Cited

U.S. PATENT DOCUMENTS

2004/0216114 A1* 10/2004 Lin ........................ G06F 9/5083
718/105
2005/0251792 A1* 11/2005 Smith ................. G06F 11/3419
717/131
(Continued)

FOREIGN PATENT DOCUMENTS

JP   H10-049504 A   2/1998
JP   2006-268754 A  10/2006
(Continued)

OTHER PUBLICATIONS

Ganesh Ananthanarayanan et al, "Reining in the Outliers in Map-Reduce Clusters using Mantri", Proceedings of the 9th USENIX Symposium on Operating Systems Design and Implementation (OSDI '10), Oct. 4, 2010.
(Continued)

*Primary Examiner* — Ario Etienne
*Assistant Examiner* — Elizabeth Kassa

(57) ABSTRACT

An abnormality detection apparatus (2000) handles tasks allocated to a plurality of processing servers (3200) as processing targets in a distribution system (3000) having the processing servers (3200). A history acquisition unit (2020) acquires progress history information which is information regarding progress of the plurality of tasks at a plurality of time point of recording. A target range determination unit (2040) determines a target range. A distribution calculation unit (2060) calculates a task speed distribution which is a
(Continued)

probability distribution of processing speeds of the tasks using the progress history information regarding the plurality of tasks. An abnormality determination unit (2080) compares a processing speed of a task to be determined with the task speed distribution to thereby determine whether or not the processing speed of the task to be determined is abnormal.

10 Claims, 31 Drawing Sheets

(51) Int. Cl.
*G06F 11/34* (2006.01)
*H04L 12/26* (2006.01)
*H04L 29/08* (2006.01)

(52) U.S. Cl.
CPC .......... *G06F 11/3452* (2013.01); *H04L 43/50* (2013.01); *H04L 67/10* (2013.01); *G06F 2209/508* (2013.01)

(58) Field of Classification Search
USPC ........................................................ 709/201
See application file for complete search history.

(56) References Cited

U.S. PATENT DOCUMENTS

| | | | |
|---|---|---|---|
| 2006/0218558 A1* | 9/2006 | Torii ................... | G06F 9/4887 718/107 |
| 2011/0029817 A1* | 2/2011 | Nakagawa .......... | G06F 11/0709 714/37 |
| 2012/0131591 A1* | 5/2012 | Moorthi ................ | G06Q 10/06 718/104 |
| 2013/0116976 A1* | 5/2013 | Kanemasa .......... | G06F 11/3419 702/186 |

FOREIGN PATENT DOCUMENTS

| | | |
|---|---|---|
| JP | 2007-317038 A | 12/2007 |
| JP | 2008-123205 A | 5/2008 |
| JP | 2008-243216 A | 10/2008 |
| JP | 2010-231488 A | 10/2010 |
| JP | 2010-277604 A | 12/2010 |
| JP | 2011-128781 A | 6/2011 |

OTHER PUBLICATIONS

International Search Report for PCT Application No. PCT/JP2014/055844, dated May 13, 2014.
Japanese Office Action for JP Application No. 2015-523883 dated Jul. 11, 2017 with English Translation.

* cited by examiner

| TASK ID | TIME OF RECORDING | DEGREE OF PROGRESS |
|---|---|---|
| task1 | 2:00:00 | 15% |
| task2 | 1:59:00 | 30% |
| task1 | 1:58:00 | 7% |

| TIME OF RECORDING | PROCESSING SERVER ID | TASK ID |
|---|---|---|
| 2:00:00 | server1 | task1, task2 |
| 1:50:00 | server2 | task3, task4 |
| 1:40:00 | server1 | task1 |

300
302 — TIME OF RECORDING
304 — PROCESSING SERVER ID
306 — TASK ID

FIG. 22

| TASK IDENTIFIER | TIME OF RECORDING | PROCESSING PROGRESS RATE PER SECOND |
| --- | --- | --- |
| T1 | 1:30:01 | 5% |
| T2 | 1:30:00 | 20% |
| T3 | 1:30:01 | 15% |
| T4 | 1:30:02 | 25% |

FIG. 23

| TASK IDENTIFIER | TIME OF RECORDING | PROCESSING PROGRESS RATE PER SECOND |
|---|---|---|
| T1 | 1:28:02 | 50% |
| T2 | 1:28:03 | 45% |
| T3 | 1:29:02 | 20% |
| T4 | 1:29:05 | 25% |
| T1 | 1:30:01 | 5 % |
| T2 | 1:30:00 | 20 % |
| T3 | 1:30:01 | 15% |
| T4 | 1:30:02 | 25% |

FIG. 25

| TASK IDENTIFIER | TIME OF RECORDING | TASK COMPLETION TIME |
|---|---|---|
| T1 | 1:30:01 | 20 SECONDS |
| T2 | 1:30:00 | 5 SECONDS |
| T3 | 1:30:01 | 7 SECONDS |
| T4 | 1:30:02 | 4 SECONDS |

FIG. 26

| TASK IDENTIFIER | TIME OF RECORDING | TASK COMPLETION TIME |
|---|---|---|
| T'1 | 1:28:02 | 2 SECONDS |
| T'2 | 1:28:03 | 2 SECONDS |
| T'3 | 1:29:02 | 5 SECONDS |
| T'4 | 1:29:05 | 4 SECONDS |
| T1 | 1:30:01 | 20 SECONDS |
| T2 | 1:30:00 | 5 SECONDS |
| T3 | 1:30:01 | 7 SECONDS |
| T4 | 1:30:02 | 4 SECONDS |

FIG. 27

| TASK IDENTIFIER | TIME OF RECORDING | TASK COMPLETION TIME |
|---|---|---|
| T'3 | 1:29:02 | 5 SECONDS |
| T'4 | 1:29:05 | 4 SECONDS |
| T1 | 1:30:01 | 20 SECONDS |
| T2 | 1:30:00 | 5 SECONDS |
| T3 | 1:30:01 | 7 SECONDS |
| T4 | 1:30:02 | 4 SECONDS |

FIG. 29

| TIME OF RECORDING | NUMBER OF JOBS |
|---|---|
| 1:28:00 | 1 |
| 1:29:01 | 2 |
| 1:29:30 | 2 |
| 1:30:01 | 2 |
| 1:30:02 | 2 |

FIG. 30

| TASK IDENTIFIER | TIME OF RECORDING | TASK COMPLETION TIME | ABNORMALITY FLAG |
|---|---|---|---|
| T'1 | 1:28:02 | 2 SECONDS | false |
| T'2 | 1:28:03 | 2 SECONDS | false |
| T'3 | 1:29:00 | 3 SECONDS | false |
| T'4 | 1:29:02 | 5 SECONDS | false |
| T'5 | 1:29:05 | 4 SECONDS | false |
| T'6 | 1:29:30 | 1 SECOND | true |
| T1 | 1:30:01 | 20 SECONDS | false |
| T2 | 1:30:00 | 5 SECONDS | false |
| T3 | 1:30:01 | 7 SECONDS | false |
| T4 | 1:30:02 | 4 SECONDS | false |

ABNORMALITY DETECTION APPARATUS, CONTROL METHOD, AND PROGRAM

This application is a National Stage Entry of PCT/JP2014/055844 filed on Mar. 6, 2014 which claims priority from Japanese Patent Application 2013-136427 filed on, Jun. 28, 2013, the contents of all of which are incorporated herein by reference, in their entirety.

TECHNICAL FIELD

The present invention relates to an abnormality detection apparatus, a control method, and a program.

BACKGROUND ART

Distribution systems, which distribute a plurality of tasks generated by dividing a job into a plurality of computers (hereinafter, processing servers) and execute the tasks, have been developed. The processing server accepts the allocation of a new task when it becomes in a state where it can executes a task. In such a type of distribution system, new tasks are allocated in order from processing servers in which a task has ended, and thus a high-speed processing server is likely to be allocated more tasks. As a result, the execution efficiency of the job is increased.

The related arts disclosing a technique for allocating a task to a processing server and a technique related thereto includes Non-Patent Document 1 and Patent Documents 1 to 4. Non-Patent Document 1 discloses a technique for reducing a time required for processing a task being in execution. Specifically, first, a time required for processing a task being executed on a processing server is calculated for two cases of 1) a case where the execution of the task is continued as it is and 2) a case where the task is restarted. The task is restarted when the required time become shorter by restarting the task.

Patent Documents 1 and 2 disclose a technique of statically calculating a task allocation schedule based on a load index of the tasks and a performance index of the processing server which are measured in advance. Patent Document 3 discloses a technique of dividing a job into a plurality of tasks and processing the tasks in parallel by allocating the divided tasks to a plurality of processing servers, when a job completion time estimated based on a progress condition of the job does not satisfy a required job completion time. Patent Document 4 discloses a technique of allocating a task to a high performance processing server based on a static performance index value, which is calculated based on the configuration of the processing server.

RELATED DOCUMENTS

Patent Documents

[Patent Document 1] Japanese Unexamined Patent Application Publication No. 2008-243216
[Patent Document 2] Japanese Unexamined Patent Application Publication No. 2010-277604
[Patent Document 3] Japanese Unexamined Patent Application Publication No. 2008-123205
[Patent Document 4] Japanese Unexamined Patent Application Publication No. 2007-317038
[Non-Patent Document 1] Ganesh Ananthanarayanan, and six others, "Reining in the Outliers in Map-Reduce Clusters using Mantri", Proceedings of the 9th USENIX Symposium on Operating Systems Design and Implementation (OSDI '10), Oct. 4, 2010

SUMMARY OF THE INVENTION

Technical Problem

In a distribution system, a processing speed of a portion of a task may temporarily decrease. There are various causes such as a failure of a processing server which is executing the task, a software bug which is executed on the processing server, fragmentation of data used for the task, and congestion in a network to which the processing server is connected. Here, in order to complete a job, it is necessary to complete all tasks generated by dividing the job. For this reason, when a processing speed of a portion of a task decreases, the completion of the entire job including the task may be delayed.

In the technique disclosed in Patent Document 1 or 2, the task allocation schedule is calculated based on the load index of the tasks and the performance index of the processing server which are measured in advance, and thus a temporary delay in the processing speed of the task is not reflected in the allocation schedule. The technique disclosed in Patent Document 3 is a technique for reducing a time required for the completion of a task being executed, but is not a technique for solving a temporary reduction in a processing speed of a task. The technique disclosed in Patent Document 4 is a technique of allocating tasks based on a performance index value of a processing server which is calculated in advance, and a processing speed of a task being executed is not reflected on the allocation of the task.

On the other hand, the technique of Non-Patent Document 1 determines a task the processing speed of which temporarily decreases, and controls the execution of the task.

Here, even when the task operates normally, the processing speed of the task changes. For this reason, when it is determined whether or not the processing speed of the task temporarily decreases, the accuracy of the determination may deteriorate if it is not considered that "the processing speed of the task changes even in a normal occasion". In the technique of Non-Patent Document 1, a predicted required time in the case of restarting a certain task is calculated based on an average value of processing speeds of all tasks in a phase, which tasks are included in the same phase as the certain task. Therefore, the technique of Non-Patent Document 1 does not take into account changes in the processing speed of tasks within the same phase.

The present invention is contrived in view of the above-described problem. An object of the present invention is to provide a technique of determining whether or not a processing speed of a task is abnormal in a distribution system, with a high level of accuracy.

Solution to Problem

According to the present invention, there is provided an abnormality detection apparatus handling tasks allocated to a plurality of servers as processing targets in a distribution system having a plurality of servers, the abnormality detection apparatus including: a history acquisition unit acquiring progress history information regarding progress of the plurality of tasks at each of a plurality of time points of recording; a target range determination unit determining a target range; a distribution calculation unit calculating a task speed distribution using only the progress history information the time point of recording of which is included in the target range among the progress history information acquired by the history acquisition unit, the task speed distribution being a probability distribution of processing speeds of the tasks; and an abnormality determination unit determining whether or not a processing speed of a target task is abnormal by comparing a processing speed of the target task with the task speed distribution.

According to the present invention, there is provided a control method which is executed by a computer that handles tasks allocated to a plurality of servers as processing targets in a distribution system having the plurality of the servers. The control method includes a history acquisition step of acquiring progress history information regarding progress of the plurality of tasks at each of a plurality of time points of recording; a target range determination step of determining a target range; a distribution calculation step of calculating a task speed distribution using only the progress history information the time point of recording of which is included in the target range among the progress history information acquired by the history acquisition step, the task speed distribution being a probability distribution of processing speeds of the tasks; and an abnormality determination step of determining whether or not a processing speed of a target task is abnormal by comparing a processing speed of the target task with the task speed distribution.

According to the present invention, there is provided a program causing a computer to have a function of operating as an abnormality detection apparatus according to the present invention. The program causes the computer to have functions of functional components of the abnormality detection apparatus according to the present invention.

Advantageous Effects of Invention

According to the present invention, a technique of determining whether or not a processing speed of a task has become abnormal in a distribution system, with a high level of accuracy is provided.

BRIEF DESCRIPTION OF THE DRAWINGS

The above-mentioned objects, other objects, features and advantages will be made clearer from the preferred exemplary embodiments described below, and the following accompanying drawings.

FIG. 5 is a diagram illustrating a configuration of progress history information in a table format.

FIG. 13 is a diagram illustrating a configuration of allocation information in a table format.

FIG. 22 is a diagram collectively illustrating pieces of progress degree information stored in progress degree information storage units of computers c1 and c2.

FIG. 23 is a diagram illustrating progress history information which is managed by a history management unit.

FIG. 25 is a diagram collectively illustrating pieces of progress degree information stored in progress degree information storage units of computers c1 and c2.

FIG. 26 is a diagram illustrating progress history information which is managed by a history management unit.

FIG. 27 is a diagram illustrating progress history information included in a target range which is determined by a target range determination unit.

FIG. 29 is a diagram illustrating allocation information which is acquired by an allocation information acquisition unit.

FIG. 30 is a diagram illustrating progress history information which is stored in a history management unit.

DESCRIPTION OF EXEMPLARY EMBODIMENTS

Hereinafter, exemplary embodiments of the invention will be described with reference to the accompanying drawings.

Figure 1:
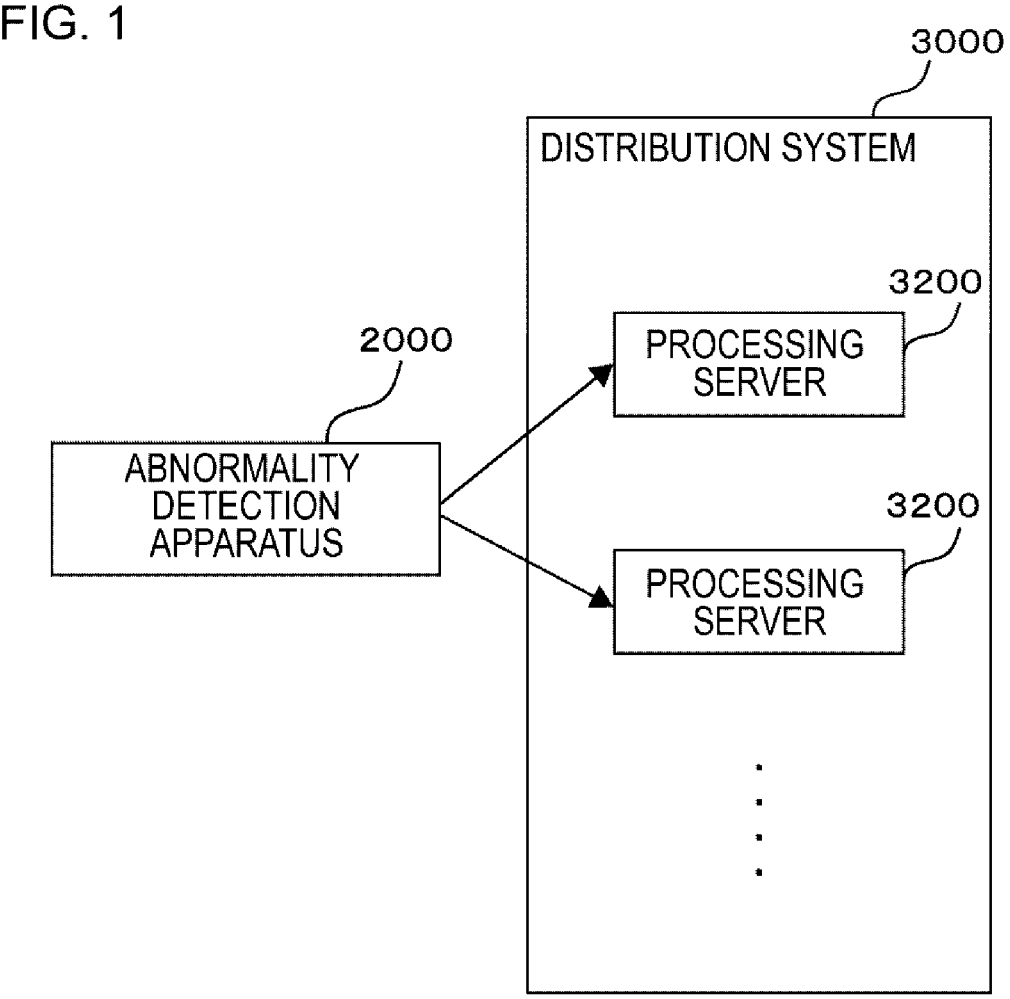
FIG. 1 is a block diagram illustrating an abnormality detection apparatus according to a first exemplary embodiment together with a usage environment thereof.

In all the drawings, like reference numerals denote like components, and a description thereof will not be repeated.
First Exemplary Embodiment FIG. 1 is a block diagram illustrating an abnormality detection apparatus 2000 according to a first exemplary embodiment together with a usage environment thereof. In FIG. 1, an arrow indicates a flow of information. Further, in FIG. 1, each block represents a function-based configuration rather than a hardware-based configuration.

A distribution system 3000 includes a plurality of processing servers 3200. Task is allocated to each of the processing servers 3200. The processing server 3200 is any kind of computers such as a server, a personal computer (PC), and a tablet terminal. The processing server 3200 executes the allocated task. The abnormality detection apparatus 2000 handles the task allocated to the processing server 3200 as a processing target. Specifically, the abnormality detection apparatus 2000 determines whether or not a processing speed of the task in execution on the processing server 3200 is abnormal. The abnormality detection apparatus 2000 is any kind of computers similar to the processing server 3200. Note that, the number of tasks executed on the processing server 3200 may be one or two or more.

The processing server 3200 and the abnormality detection apparatus 2000 are connected to each other through a network. The network may be a network configured by a wired line, may be a network configured by a wireless line, or may be a network configured by a combination of a wired line and a wireless line.

Figure 2:
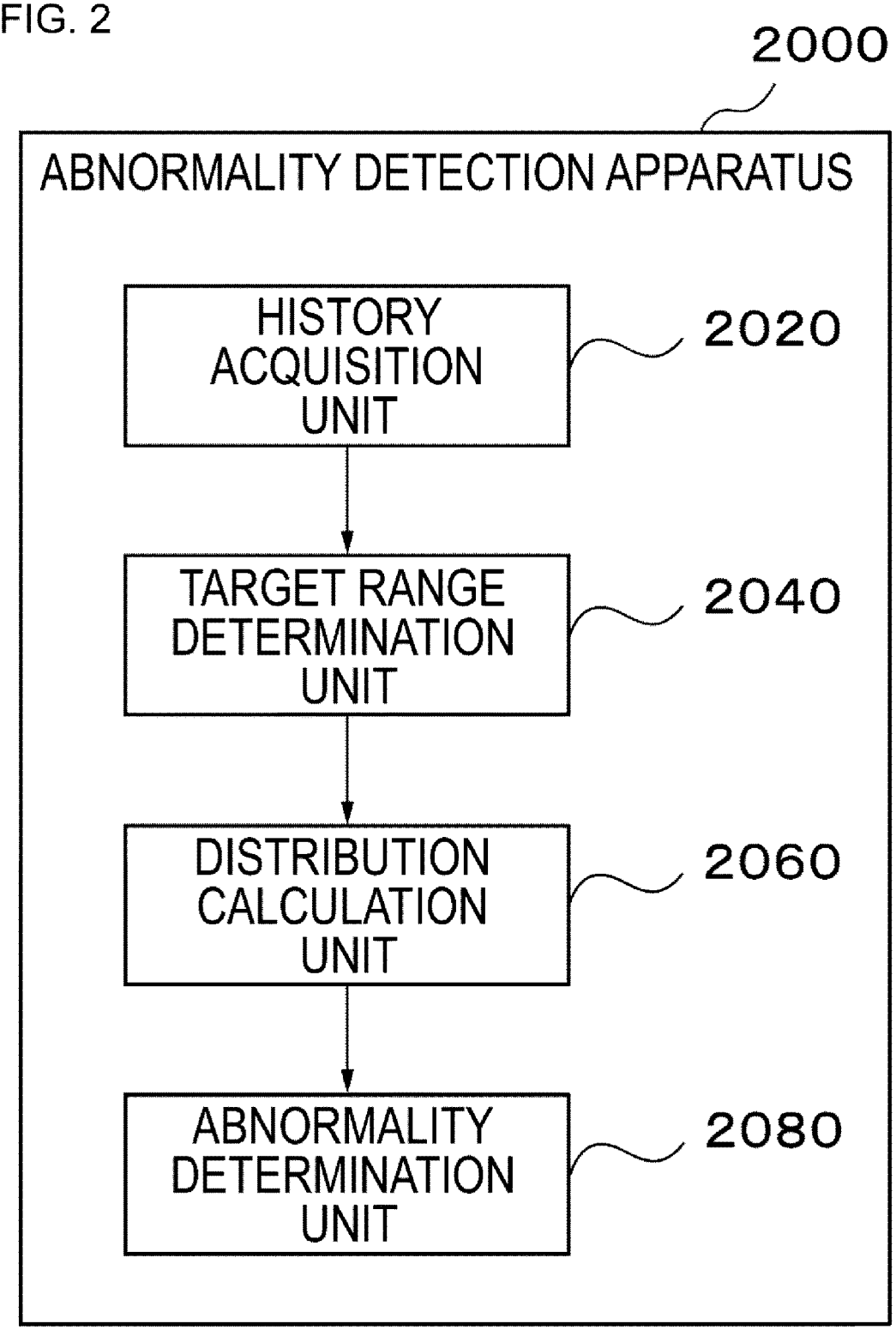
FIG. 2 is a block diagram illustrating a configuration of the abnormality detection apparatus according to the first exemplary embodiment.

FIG. 2 is a block diagram illustrating a configuration of the abnormality detection apparatus 2000 according to the first exemplary embodiment. In FIG. 2, an arrow indicates a flow of information.

Further, in FIG. 2, each block represents a function-based configuration rather than a hardware-based configuration. The abnormality detection apparatus 2000 includes a history acquisition unit 2020, a target range determination unit 2040, a distribution calculation unit 2060, and an abnormality determination unit 2080. Hereinafter, each of the units will be described.

<History Acquisition Unit 2020>

The history acquisition unit 2020 acquires progress history information. The progress history information is information regarding the progress of a plurality of tasks at each of a plurality of time points of recording.

<Target Range Determination Unit 2040>

The target range determination unit 2040 determines a target range.

<Distribution Calculation Unit 2060>

The distribution calculation unit 2060 calculates a probability distribution of processing speeds of tasks using progress history information regarding a plurality of tasks. The probability distribution is denoted as a task-speed distribution. Here, the distribution calculation unit 2060 calculates a task-speed distribution using only progress history information, among pieces of progress history information, in which a time point of recording is in the target range determined by the target range determination unit 2040.

<Abnormality Determination Unit 2080>

The abnormality determination unit 2080 determines whether or not the processing speed of the task to be determined is abnormal, by comparing the processing speed of the task to be determined with a task speed distribution. Hereinafter, the task to be determined is denoted as a target task.

<Hardware Configuration>

Each functional component included in the abnormality detection apparatus 2000 may be implemented as at least one hardware component, for example, individually or in a combined state. In addition, for example, each functional component may be implemented as at least one software component. In addition, for example, each functional component may be implemented as a combination of a hardware component and a software component.

Figure 3:
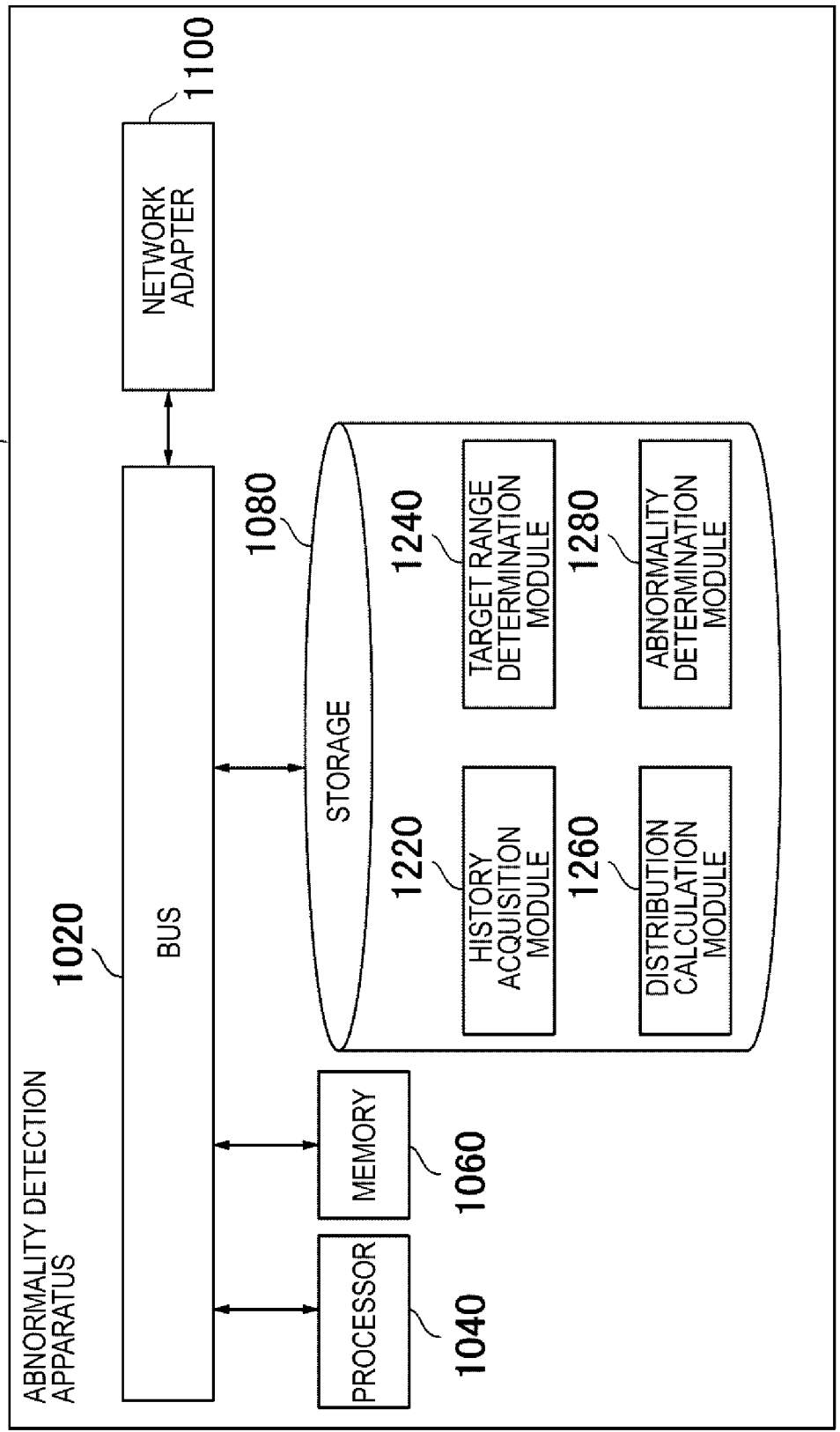
FIG. 3 is a block diagram illustrating a hardware configuration of the abnormality detection apparatus according to the first exemplary embodiment.

FIG. 3 is a block diagram illustrating a hardware configuration of the abnormality detection apparatus 2000 according to the first exemplary embodiment. In FIG. 3, the abnormality detection apparatus 2000 includes a bus 1020, a processor 1040, a memory 1060, a storage 1080, and a network adapter 1100.

The bus 1020 is a data transmission path through which the processor 1040, the memory 1060, the storage 1080, and the network adapter 1100 transmit and receive data to and from each other. The processor 1040 is an arithmetic processing unit such as, for example, a central processing unit (CPU) or a graphics processing unit (GPU). The memory 1060 is a memory such as, for example, a random access memory (RAM) or a read only memory (ROM). The storage 1080 is a storage apparatus such as, for example, a hard disk, a solid state drive (SSD), or a memory card. In addition, the storage 1080 may be a memory such as a RAM or a ROM. The network adapter 1100 is an interface for performing communication between the abnormality detection apparatus 2000 and an external apparatus through a network. The network adapter 1100 may be an interface for connection to a wireless line, or may be an interface for connection to a wired line.

A history acquisition module 1220 is a program for causing the abnormality detection apparatus 2000 to function as the history acquisition unit 2020. The processor 1040 realizes the function of the history acquisition unit 2020 by executing the history acquisition module 1220.

The target range determination module 1240 is a program for causing the abnormality detection apparatus 2000 to function as the target range determination unit 2040. The processor 1040 realizes the function of the target range determination unit 2040 by executing the target range determination module 1240.

The distribution calculation module 1260 is a program for causing the abnormality detection apparatus 2000 to function as the distribution calculation unit 2060. The processor 1040 realizes the function of the distribution calculation unit 2060 by executing the distribution calculation module 1260.

The abnormality determination module 1280 is a program for causing the abnormality detection apparatus 2000 to function as the abnormality determination unit 2080. The processor 1040 realizes the function of the abnormality determination unit 2080 by executing the abnormality determination module 1280.

For example, the processor 1040 reads out each of the above-mentioned modules on the memory 1060 and executes the module. However, the processor 1040 may execute each of the above-mentioned modules without reading out the module on the memory 1060.

The storage 1080 stores each of the above-mentioned modules.

A hardware configuration of the abnormality detection apparatus 2000 is not limited to the configuration illustrated in FIG. 3. For example, each of the above-mentioned modules may be stored in the memory 1060. In this case, the abnormality detection apparatus 2000 may not include the storage 1080.

<Flow of Processing>

Figure 4:
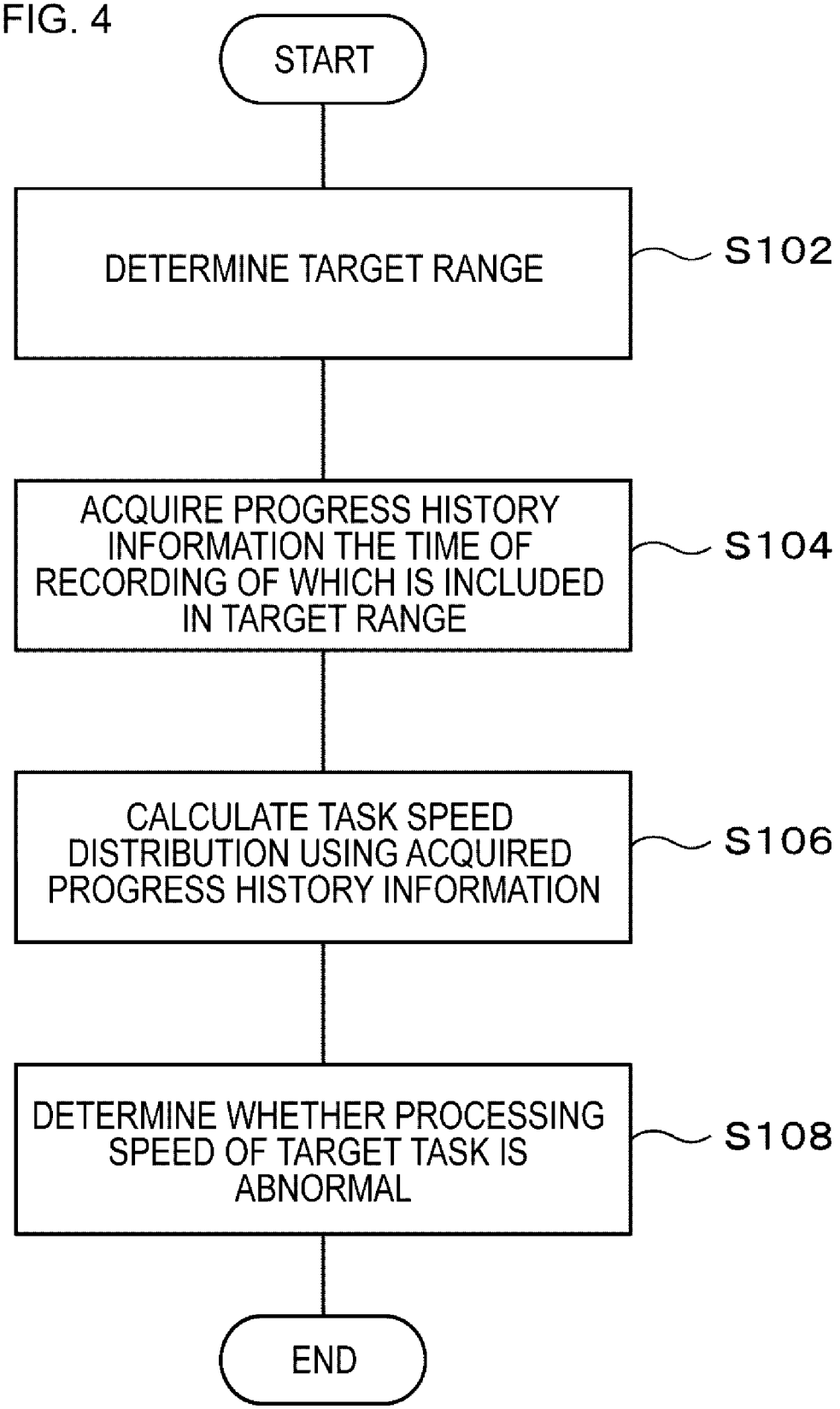
FIG. 4 is a flow chart illustrating a flow of a process performed by the abnormality detection apparatus according to the first exemplary embodiment.

FIG. 4 is a flow chart illustrating a flow of a process performed by the abnormality detection apparatus 2000 according to the first exemplary embodiment. In step S102, the target range determination unit 2040 determines a target range. In step S104, the history acquisition unit 2020 acquires progress history information in which a time point of recording is in the target range. In step S106, the distribution calculation unit 2060 calculates a task speed probability distribution using the progress history information acquired by the history acquisition unit 2020. In step S108, the abnormality determination unit 2080 determines whether or not a processing speed of a target task is abnormal.

As described above, the abnormality detection apparatus 2000 of the present exemplary embodiment determines a target range of a time point of recording of progress history information which is used for the calculation of a task speed distribution. Here, a processing speed of a task fluctuates even in a normal occasion. For this reason, when a task speed distribution is generated using a history of a processing speed of a task over a long period, a fluctuation in a processing speed of a normal task during a long period may be reflected on the task speed distribution. Accordingly, the task processing distribution may not accurately represent a range of speed to be taken by the task at a time point of determination by the abnormality determination unit 2080, which results in a deterioration in the accuracy of the determination by the abnormality determination unit 2080. According to the present exemplary embodiment, the task speed distribution is calculated using only progress history information included in the target range which is determined by the target range determination unit 2040. Therefore, the accuracy of the determination of the abnormality determination unit 2080 is higher than in a case where a process of determining a target range is not performed.

Hereinafter, the abnormality detection apparatus 2000 of the present exemplary embodiment will be described in more detail.

<Details of History Acquisition Unit 2020>

FIG. 5 is a diagram illustrating a configuration of progress history information in a table format. The progress history information illustrated in FIG. 5 is denoted as a progress history information table 200. The progress history information table 200 includes a task ID 202, a time point of recording 204, and a degree of progress 206. In each record in the progress history information table 200, the degree of progress 206 indicates a degree of progress of a task specified by the task ID 202 at the time point of recording 204.

The degree of progress 206 is information regarding the progress of a task. For example, the degree of progress 206 indicates information which can be used for the calculation of a processing speed of a task. Specifically, the degree of progress 206 indicates a progress rate of a task, a ratio of the amount of processed data to the amount of data to be processed, and the like. In addition, the degree of progress 206 may indicate a value obtained by accumulating the amounts of resources that the task used. It is possible to predict the progress of a task by ascertaining how much resources have been used by the task. Resource utilization is, for example, CPU utilization, memory utilization, and a utilization of a disk bandwidth or a network bandwidth. Further, the degree of progress 206 may be a predicted value of the remaining processing time that is computed with a mathematical model. In addition, the degree of progress 206 may directly indicate a processing speed of a task rather than information that can be used to calculate the processing speed of the task. The processing speed of the task may be a progress rate of a task per unit time, the amount of processes data processed per unit time, the amount of used resources per unit time, or the like.

There are various methods for the history acquisition unit 2020 to acquire progress history information. For example, the history acquisition unit 2020 may access to an external apparatus to acquire progress history information. In addition, for example, the history acquisition unit 2020 may acquire progress history information that is input from an external apparatus or progress history information that is manually input. Here, the history acquisition unit 2020 may acquire only progress history information in which a time point of recording is included in a target range, or may acquire progress history information regardless of whether or not a time point of recording is included in a target range. In the former case, the distribution calculation unit 2060 calculates a task speed distribution using the entire progress history information acquired by the history acquisition unit 2020. On the other hand, in the latter case, the distribution calculation unit 2060 performs a process of selecting only progress history information having a time point of recording included in a target range, among the progress history information acquired by the history acquisition unit 2020.

<Details of Distribution Calculation Unit 2060>

The distribution calculation unit 2060 handles processing speed of tasks as samples, and estimates a probability distribution of the processing speeds of the tasks in the population thereof. The distribution calculation unit 2060 handles the estimated probability distribution to be a task speed distribution. Here, when progress history information directly indicates the processing speed of the task, the distribution calculation unit 2060 calculates a task speed distribution using as a sample a processing speed indicated by progress history information having the time point of recording included in a target range. On the other hand, when the progress history information does not directly indicate a processing speed of a task, the distribution calculation unit 2060 calculates the processing speed of the task using the progress history information. The distribution calculation unit 2060 calculates a task speed distribution using the calculated processing speed as a sample.

A method for the distribution calculation unit 2060 to calculate a processing speed from progress history information depends on information indicated by progress history information. For example, when the progress history information indicates degrees of progress of the same task at two different time points of recordings, the distribution calculation unit 2060 calculates the degree of progress per unit time by calculating "the difference in the degrees of progress divided by the difference in the time points of recording". The distribution calculation unit 2060 handles the progress degree per unit time as a processing speed of a task.

There are various models of a probability distribution of the processing speeds of the tasks which is estimated by the distribution calculation unit 2060. Examples of the probability distribution model include a model in which a probability 1 and a probability 0 are switched at a certain threshold value, a normal distribution, a Poisson distribution, a chi-square distribution, an exponential distribution, and the like. Which probability distribution model is used by the distribution calculation unit 2060 in calculating a task speed distribution may be configured in the distribution calculation unit 2060 in advance, or may be configured from the outside. In addition, the distribution calculation unit 2060 itself may determine a probability distribution model to be used, using progress history information and the like.

EXAMPLE 1

A specific example of a process of calculating a task speed distribution performed by the distribution calculation unit 2060 is shown as Example 1. In this example, the task speed distribution calculated by the distribution calculation unit 2060 is a probability distribution using a model in which a probability 1 and a probability 0 are switched at a threshold value. In the present example, a constant multiple of the highest speed of a task is set as a threshold value.

Figure 6:
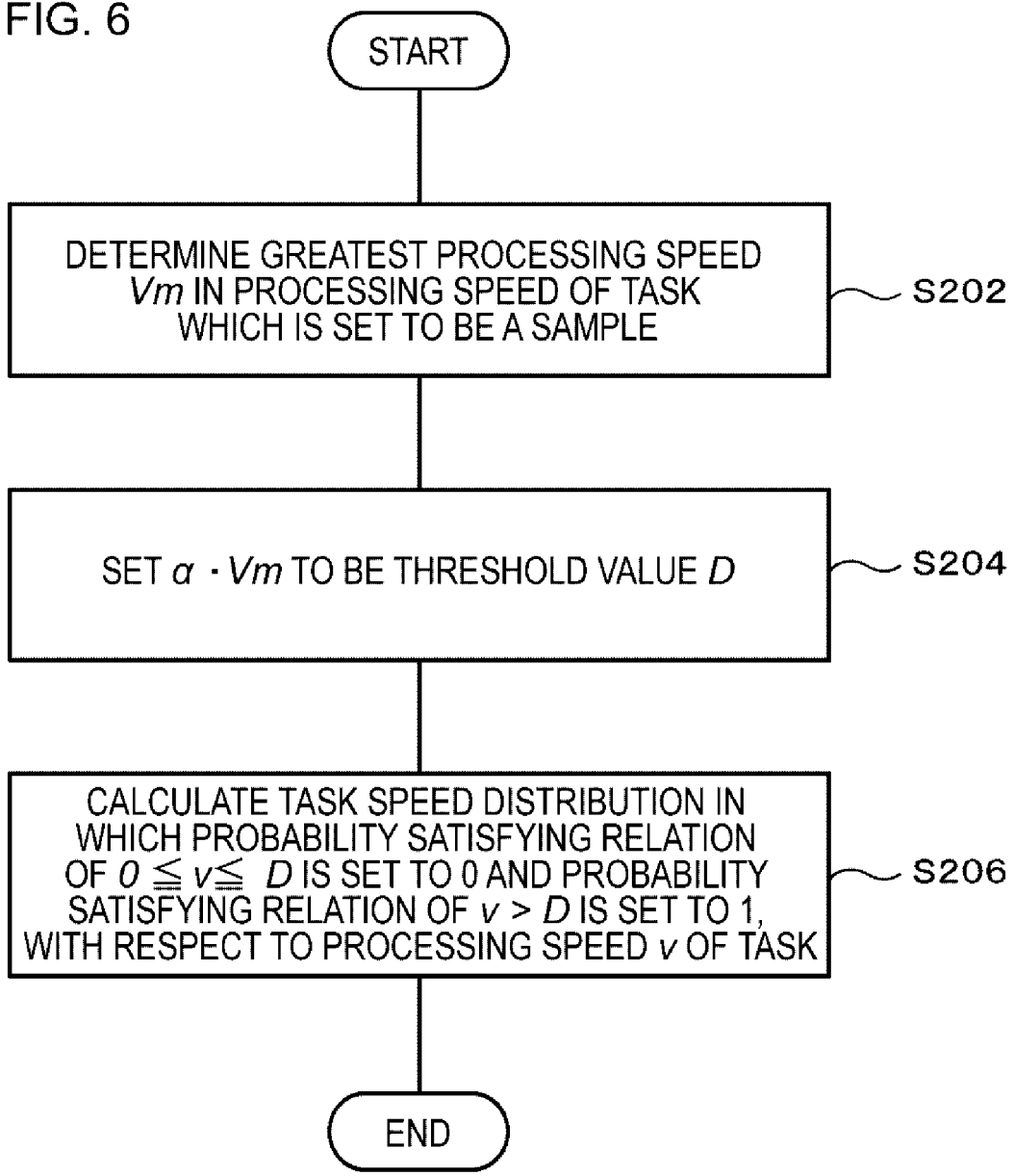
FIG. 6 is a flow chart illustrating a flow of a process of calculating a task speed distribution performed by a distribution calculation unit according to Example 1.

FIG. 6 is a flow chart illustrating a flow of a process of calculating a task speed distribution performed by the distribution calculation unit 2060 according to Example 1. Here, a constant α (0<α≤1) is set in the distribution calculation unit 2060. Here, α may be set in the distribution calculation unit 2060 in advance, or may be set from outside of the distribution calculation unit 2060.

Figure 7:
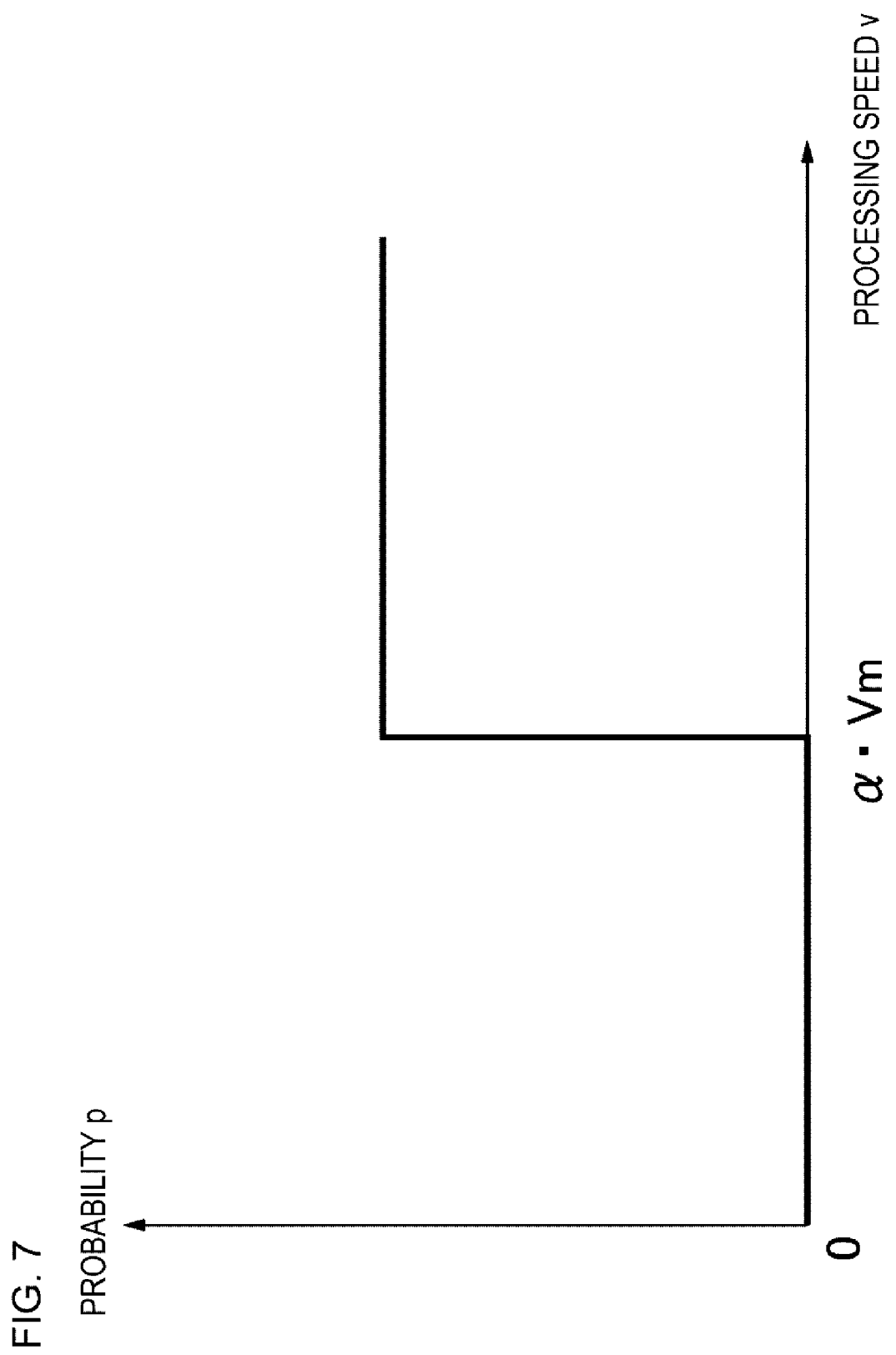
FIG. 7 is a graph illustrating the task speed distribution in Example 1.

In step S202, the distribution calculation unit 2060 determines a greatest processing speed Vm in a processing speed of a task which is handled as a sample. In step S204, the distribution calculation unit 2060 sets α·Vm as a threshold value D. In step S206, with respect to a processing speed v of a task, the distribution calculation unit 2060 calculates a task speed distribution in which a probability satisfying the relation of 0≤v≤D is 0 and a probability satisfying the relation of v>D is 1. The task speed distribution is represented by a graph of FIG. 7. In the graph of FIG. 7, a horizontal axis represents the processing speed v, and a vertical axis represents an occurrence probability p.

EXAMPLE 2

Another specific example of a process of calculating a task speed distribution in the distribution calculation unit 2060 is shown as Example 2. In this example, the task speed distribution calculated by the distribution calculation unit 2060 is a task speed distribution in a case where a Poisson distribution is used as a probability distribution model. In addition, in the present example, a processing speed of a task is represented by a predicted time until the completion of the task.

Figure 8:
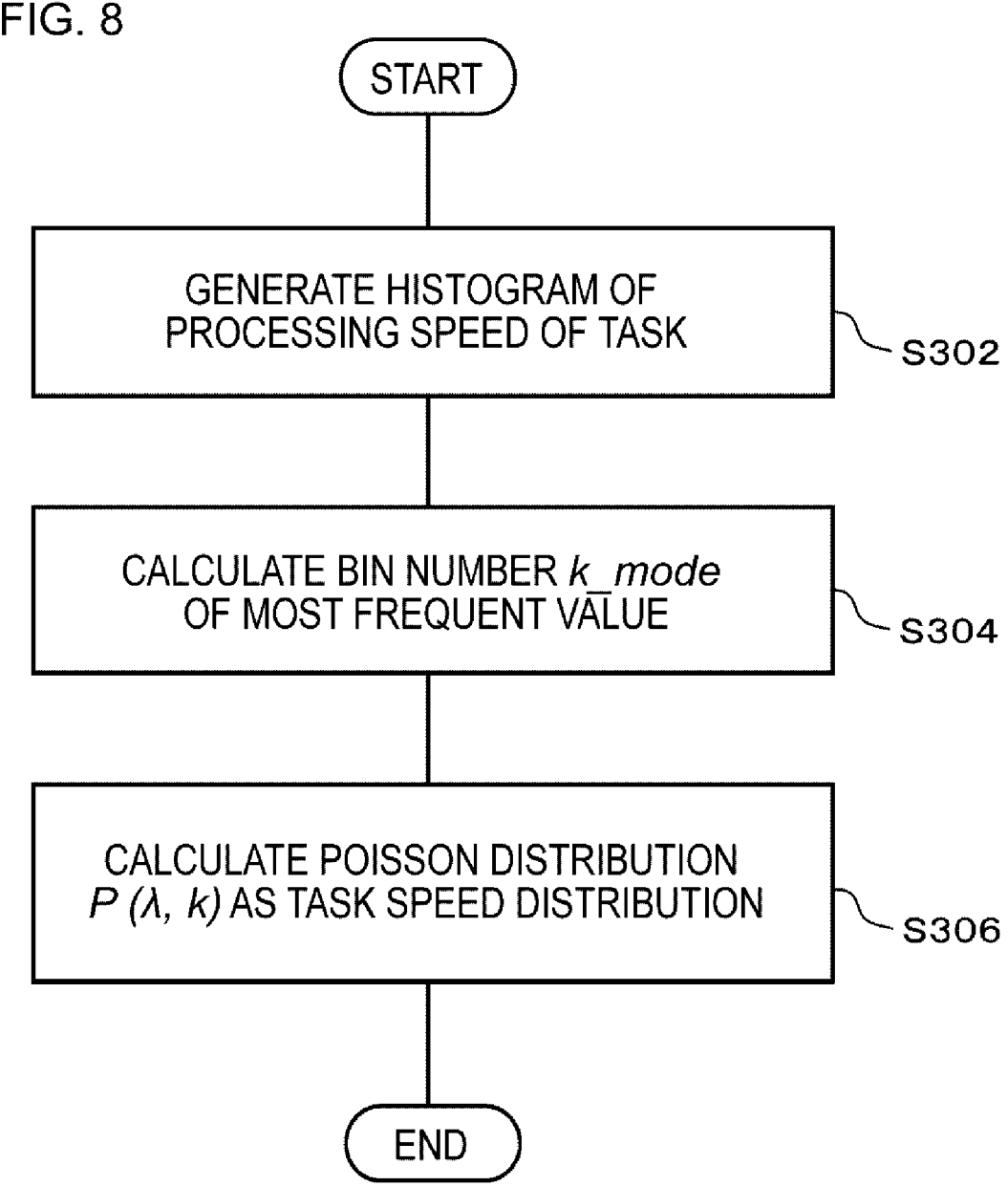
FIG. 8 is a flow chart illustrating a flow of a process of calculating a task speed distribution executed by a distribution calculation unit according to Example 2.

FIG. 8 is a flow chart illustrating a flow of a process of calculating a task speed distribution performed by the distribution calculation unit 2060 according to Example 2. In step S302, the distribution calculation unit 2060 generates a histogram of a processing speed of a task. In step S304, the distribution calculation unit 2060 calculates a mode value k_mode from the histogram. In step S306, the distribution calculation unit 2060 calculates a Poisson distribution P(λ, k) as a task speed distribution. Here, k is determined by max (k'−k_mode, 0). Note that, k' is a bin number in the histogram.

Parameters such as a width of a bin and λ may be values set in the distribution calculation unit 2060 in advance, may be values set from outside of the distribution calculation unit 2060, or may be values calculated by the distribution calculation unit 2060. When the distribution calculation unit 2060 calculates a width of a bin, for example, the distribution calculation unit 2060 calculates the width of the bin using a conversion formula such as square root selection.

Note that, although a predicted time until the completion of a task is used as a value representing a processing speed of a task in the present example, and the implementation of a method using the Poisson distribution is not limited thereto. For example, the relation of k=max (k_mode−k', 0) may be set, and thus it is possible to use the degree of progress of a task per unit time as a value representing a processing speed of the task.

In addition, the distribution calculation unit 2060 may not use progress history information regarding a target task the processing speed of which is determined to be abnormal by the abnormality determination unit 2080, for the calculation of a task speed distribution on or after the determination. For example, suppose that the abnormality detection apparatus 2000 determines a processing speed of a target task 1 is abnormal and then determines whether or not a processing speed of another target task 2 is abnormal. In this case, the distribution calculation unit 2060 calculates a task speed distribution using progress history information other than progress history information regarding the target task 1, among progress history information included in a target range. Thereby, the processing speed of the task that is determined to be abnormal is not included in samples for calculating the task speed distribution, and thus the task speed distribution more accurately represents the distribution of the processing speed to be taken by the target task.

For example, when the abnormality detection apparatus 2000 determines that a processing speed of a certain target task is abnormal, the abnormality detection apparatus deletes progress history information regarding the target task from a storage unit storing the progress history information. In addition, the abnormality detection apparatus 2000 stores the progress history information regarding the target task the processing speed of which is determined to be abnormal, in association with a flag indicating information regarding a task the processing speed of which is abnormal. The distribution calculation unit 2060 does not use the progress history information associated with the flag for the calculation of a task speed distribution, among the progress history information acquired by the history acquisition unit 2020.

<Details of Abnormality Determination Unit 2080>

There are various methods of determining whether a processing speed of a target task is abnormal using a task speed distribution in the abnormality determination unit 2080. For example, when an occurrence probability p(v1) of a processing speed v1 of a target task is equal to or less than a predetermined threshold value in a task speed distribution p(v), the abnormality determination unit 2080 determines that the processing speed of the target task is abnormal.

In addition, for example, the abnormality determination unit 2080 calculates a cumulative frequency c(v1) corresponding to the processing speed v1 of the target task using the task speed distribution p(v). The cumulative frequency c(v1) is calculated by the following Expression (1). When the cumulative frequency c(v1) corresponding to the processing speed v1 of the target task is equal to or less than a predetermined threshold value, the abnormality determination unit 2080 determines that the processing speed of the target task is abnormal.

[Expression 1]

$$c(v1) = \int_{v \leq v1} p(v) \quad (1)$$

<Details of Target Task>

There are various methods of setting which task is to be a target task in the abnormality detection apparatus 2000. For example, the abnormality detection apparatus 2000 selects tasks as target tasks in ascending or descending order of an ID, among tasks included in the distribution system 3000. In addition, for example, the abnormality detection apparatus 2000 may randomly select a target task among tasks included in the distribution system 3000. In addition, the abnormality detection apparatus 2000 may accept the designation of a target task from an external apparatus or in a manual manner. In addition, the abnormality detection apparatus 2000 may access to an external apparatus in order to acquire information indicating which task is set as a target task.

For example, the abnormality detection apparatus 2000 may periodically perform a process using each task as a target task. In addition, the abnormality detection apparatus 2000 may set for each task a different time interval of performing the process where each task is used as a target task. In this case, for example, the information, which indicates a time point or a time interval at or in which a process is performed handling each task as a target task, is stored inside or outside the abnormality detection apparatus 2000 with respect to the task.

<Operational Advantages>

The abnormality detection apparatus 2000 of the present exemplary embodiment determines a target range of a time point of recording of progress history information to be used for the calculation of a task speed distribution. Here, a processing speed of a task fluctuates even in a normal occasion. For this reason, when a task speed distribution is generated using a history of a processing speed of a task over a long period, a fluctuation in a normal processing speed of the task during a long period may be reflected on the task speed distribution. Accordingly, the task processing distribution may not accurately represent a range of speed to be taken by the task at the time point of determination of the abnormality determination unit 2080, which results in a deterioration in the accuracy of the determination of the abnormality determination unit 2080. According to the present exemplary embodiment, the task speed distribution is calculated using only progress history information included in the target range determined by the target range determination unit 2040. Therefore, the accuracy of determination performed by the abnormality determination unit 2080 increases compared to a case where a process of determining a target range is not performed.

Second Exemplary Embodiment

Figure 9:
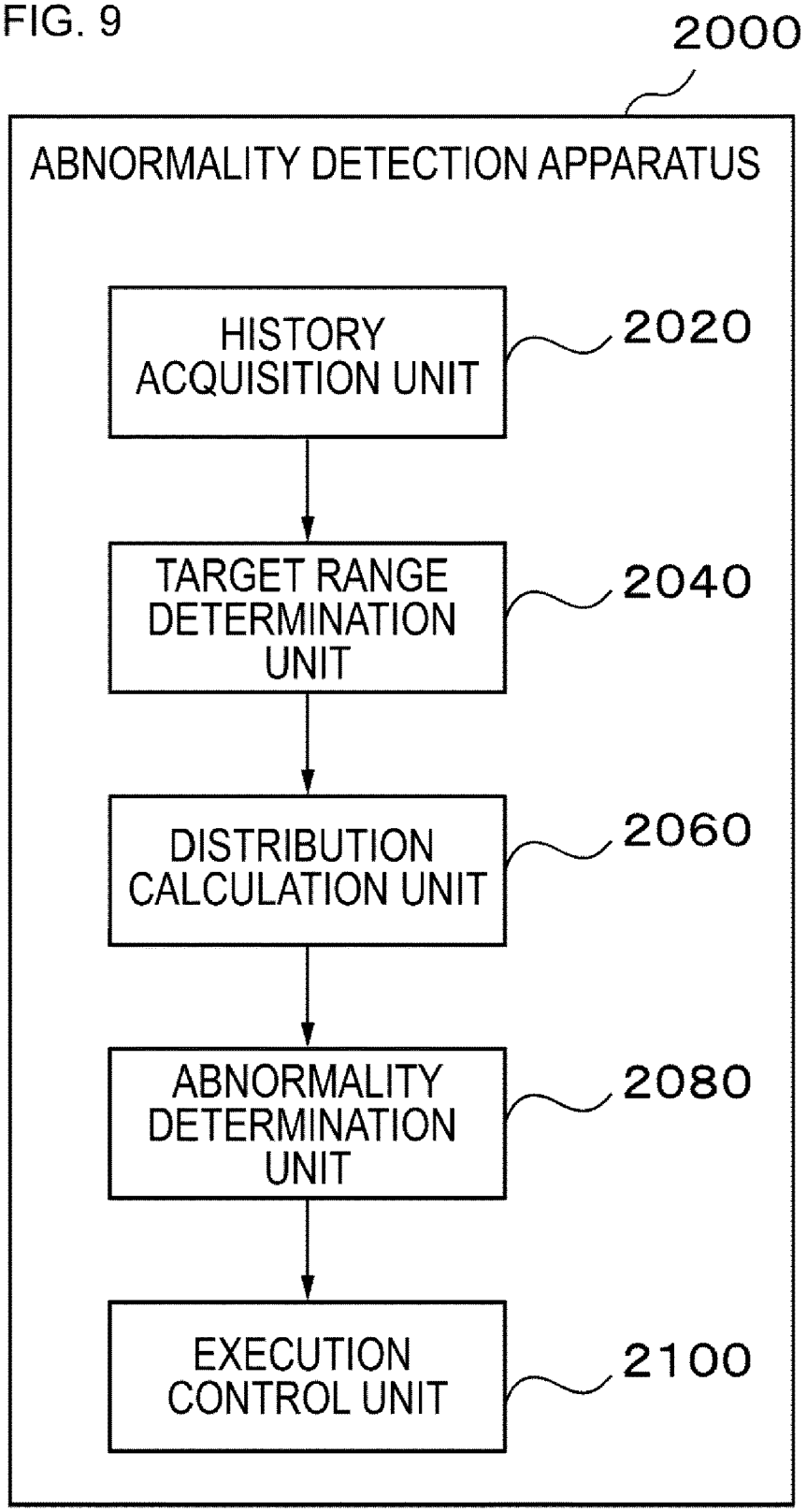
FIG. 9 is a block diagram illustrating an abnormality detection apparatus according to a second exemplary embodiment.

FIG. 9 is a block diagram illustrating an abnormality detection apparatus 2000 according to a second exemplary embodiment. In FIG. 9, an arrow indicates a flow of information. Further, in FIG. 9, each block represents a function-based configuration rather than a hardware-based configuration. The abnormality detection apparatus 2000 of the second exemplary embodiment is the same as the abnormality detection apparatus 2000 of the first exemplary embodiment except for the following description.

The abnormality detection apparatus 2000 of the second exemplary embodiment includes an execution control unit 2100. When an abnormality determination unit 2080 determines that a processing speed of a target task is abnormal, the execution control unit 2100 controls the execution of the target task. For example, the execution control unit 2100 restarts the target task on a processing server 3200 to which the target task is allocated. In addition, for example, the execution control unit 2100 duplicates the target task, and allocates the duplicated task to a processing server 3200 different from the processing server 3200 to which the target task is allocated. At this time, the execution control unit 2100 may stop the execution of the target task, or may continue the execution of the target task. When the target task continues to be executed on the original processing server 3200 and a task generated by duplicating the target task is executed on another processing server 3200, a target process is completed when the processing of either of the two tasks is completed. Note that, the execution control unit 2100 may generate a plurality of duplicated tasks from the target task. The plurality of tasks may be allocated to the same processing server 3200, or may be allocated to different processing servers 3200.

<Flow of Processing>

Figure 10:
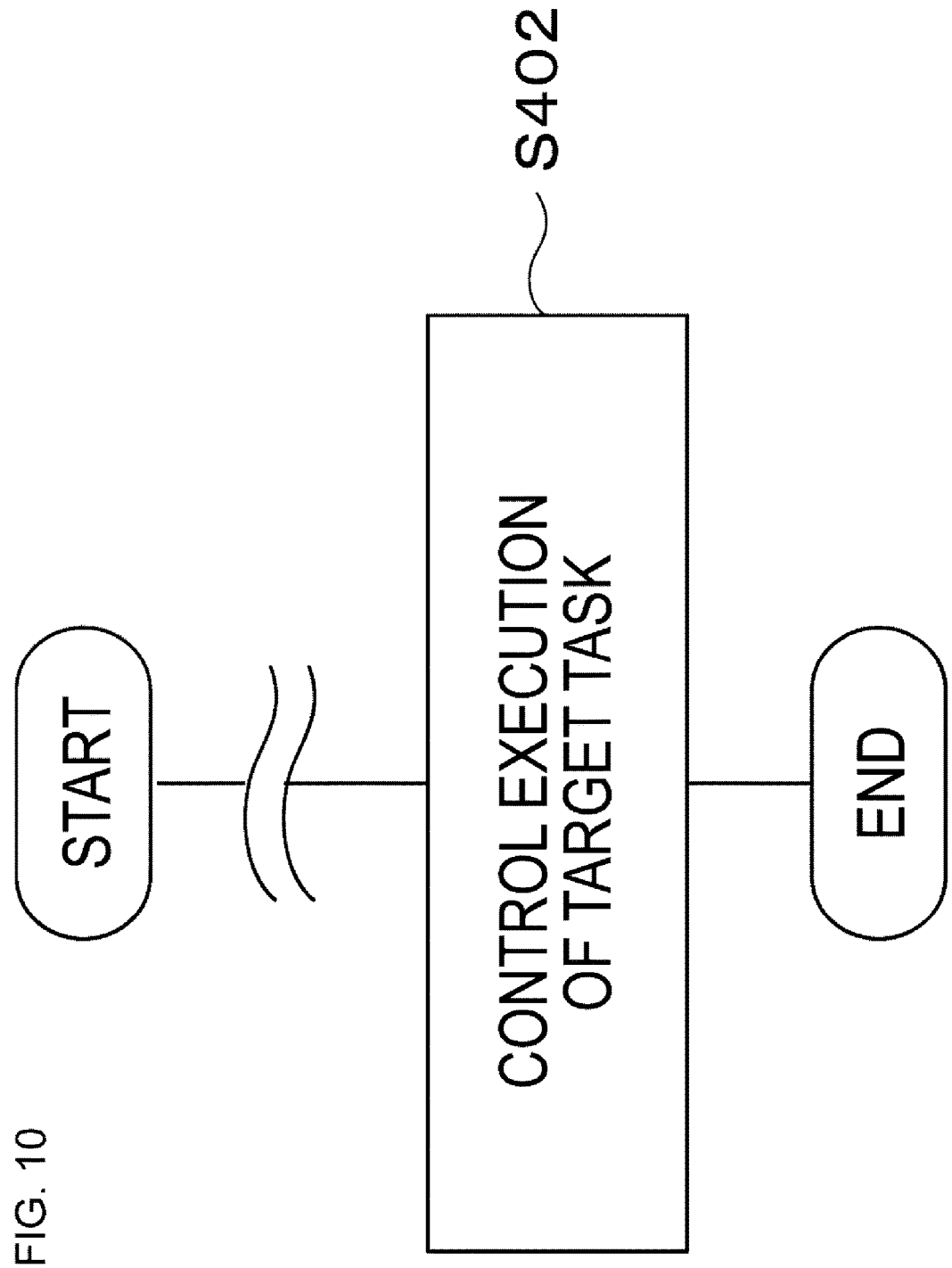
FIG. 10 is a flow chart illustrating a flow of a process performed by the abnormality detection apparatus according to the second exemplary embodiment.

FIG. 10 is a flow chart illustrating a flow of processing performed by the abnormality detection apparatus 2000 according to the second exemplary embodiment. In step S402, the execution control unit 2100 controls the execution of a target task. Note that, before executing step S402, the abnormality detection apparatus 2000 of the second exemplary embodiment executes the processes of step S102 to step S108 illustrated in FIG. 4 in the same manner as those of the abnormality detection apparatus 2000 of the first exemplary embodiment. In order to simplify the figure, step S102 to step S108 are omitted in FIG. 10.

<Operational Advantages>

According to the abnormality detection apparatus 2000 of the second exemplary embodiment, when a processing speed of a target task is abnormal, the execution of the target task is controlled. For example, the abnormality detection apparatus 2000 executes the target task again on the processing server 3200, or duplicates the target task and allocates the duplicated target task to another processing server 3200. Accordingly, a time required until a process performed by the target task is completed is reduced.

[Third Exemplary Embodiment]

Figure 11:
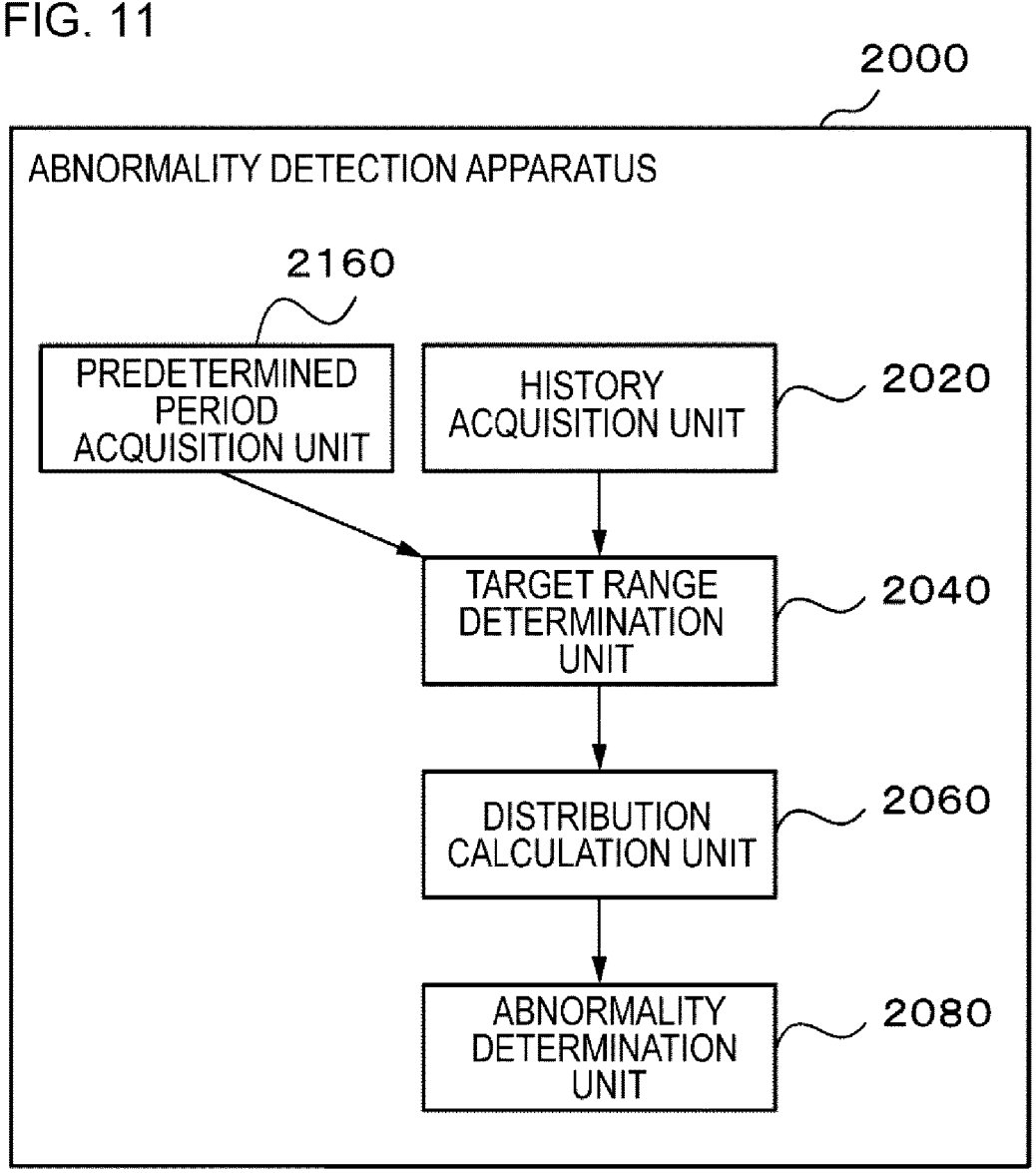
FIG. 11 is a block diagram illustrating an abnormality detection apparatus according to a third exemplary embodiment.

FIG. 11 is a block diagram illustrating an abnormality detection apparatus 2000 according to a third exemplary embodiment. In FIG. 11, an arrow indicates a flow of information. Further, in FIG. 11, each block represents a function-based configuration rather than a hardware-based configuration. The abnormality detection apparatus 2000 of the third exemplary embodiment is the same as the abnormality detection apparatus 2000 of the first or second exemplary embodiment except for the following description.

The abnormality detection apparatus 2000 of the third exemplary embodiment includes a predetermined period acquisition unit 2160. The predetermined period acquisition unit 2160 acquires a predetermined period. A target range determination unit 2040 of the third exemplary embodiment determines the length of a target range from the predetermined period.

For example, the target range determination unit 2040 sets the current time point as a termination time point of a target range. In this case, a starting time point of the target range is a time point obtained by subtracting the above-mentioned predetermined period from the current time point. However, the termination time point of the target range may not be the current time point. For example, the target range determination unit 2040 may handle a time point obtained by subtracting a predetermined value from the current time point as the termination time point of the target range. The predetermined value may be set in the target range determination unit 2040 in advance, or may be set from the outside of the target range determination unit 2040. In addition, the target range determination unit 2040 may calculate the predetermined value as a random value or the like.

\<Operational Advantages\>

As described above, according to the abnormality detection apparatus 2000 of the present exemplary embodiment, a task speed distribution is calculated using progress history information included in a target range having a length of a predetermined period. For example, the abnormality detection apparatus 2000 of the present exemplary embodiment is effective when a timing of the state transition of a task can be predicted. Here, the state of the task refers to a state where data is read, a state where the read data is processed, a state where the processed data is written, or the like. For example, a period in which the task is in each state is predicted by test-running the task in advance. By using a predetermined period that is set with the predicted period, the distribution calculation unit 2060 can calculate a task speed distribution using progress history information while the task is in one state. In a method of determining a target range using the predetermined period, a process of determining the target range is simple, and thus there is an advantage in that a time required for the determination of the target range is short.

[Fourth Exemplary Embodiment]

Figure 12:
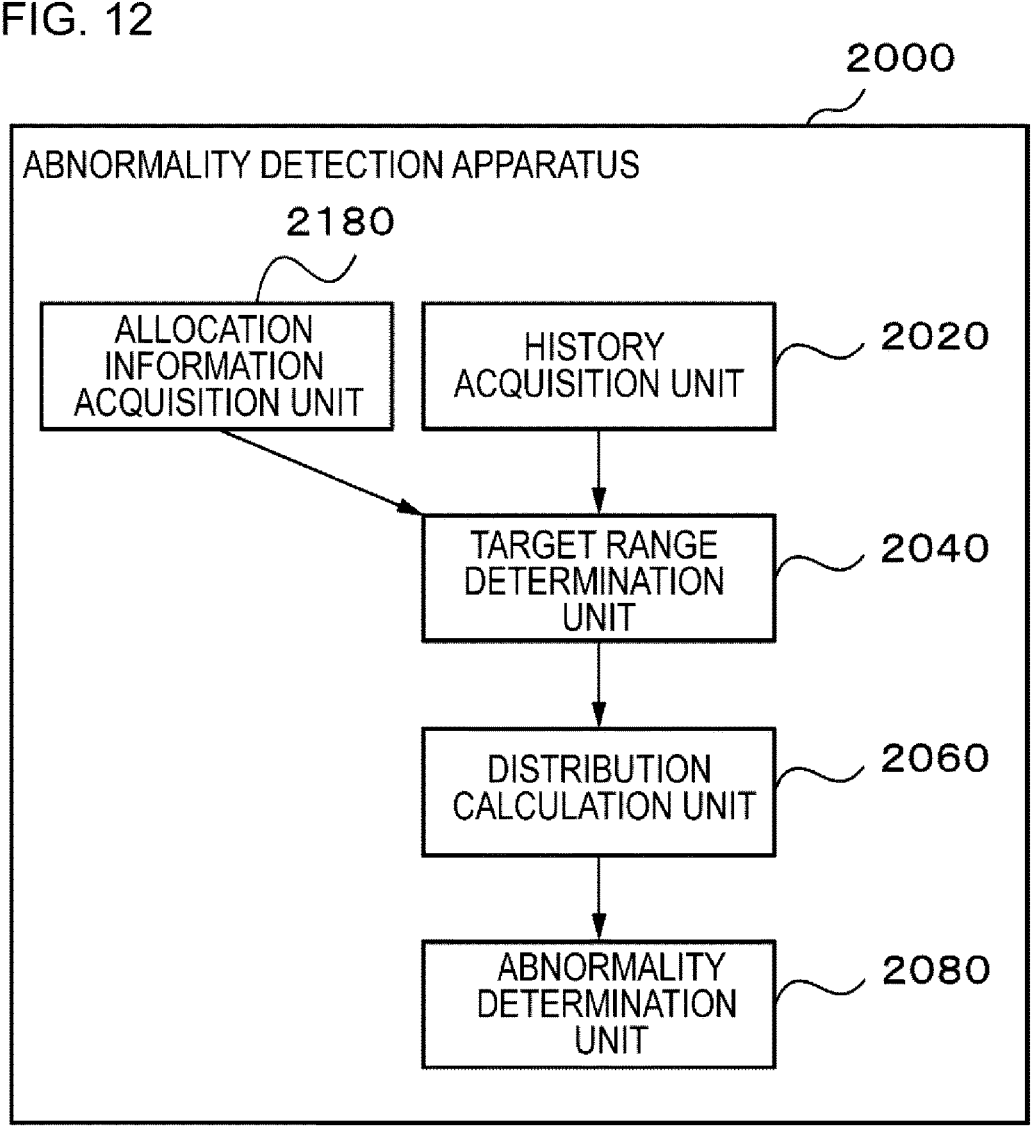
FIG. 12 is a block diagram illustrating an abnormality detection apparatus according to a fourth exemplary embodiment.

FIG. 12 is a block diagram illustrating an abnormality detection apparatus 2000 according to a fourth exemplary embodiment. In FIG. 12, an arrow indicates a flow of information. Further, in FIG. 12, each block represents a function-based configuration rather than a hardware-based configuration. The abnormality detection apparatus 2000 of the fourth exemplary embodiment is the same as the abnormality detection apparatus 2000 of the first or second exemplary embodiment except for the following description.

\<Allocation Information Acquisition Unit 2180\>

The abnormality detection apparatus 2000 of the fourth exemplary embodiment includes an allocation information acquisition unit 2180. The allocation information acquisition unit 2180 acquires allocation information. The allocation information indicates association between a processing server 3200 and a task allocated to the processing server 3200.

\<Target Range Determination Unit 2040\>

A target range determination unit 2040 of the fourth exemplary embodiment determines a target range on the basis of allocation information. Specifically, the target range determination unit 2040 handles a time point at which the allocation of a task to any processing server 3200 changes as a starting time point of the target range. For example, the target range determination unit 2040 may handle, as a starting time point of the target range, a time point at which a new task is allocated to a certain processing server 3200 or a time point at which the state of the task becomes not being allocated to the processing server 3200 from being allocated thereto. Here, the phrase "the state of the task becomes not being allocated to the processing server 3200 from being allocated thereto" means that, for example, the execution of the task is completed or the task is allocated to another processing server 3200.

Note that, the allocation information may indicate the number of jobs allocated to the distribution system 3000. When the number of jobs allocated to the distribution system 3000 changes, the allocation of a task to the processing server 3200 also changes. Therefore, the number of jobs allocated to the distribution system 3000 can be used as information for recognizing a change in the allocation of a task to the processing server 3200.

The target range determination unit 2040 detects a change in allocation information, and thereby detecting that the allocation of a task to the processing server 3200 has changed. For example, the target range determination unit 2040 periodically acquires allocation information, and monitors whether or not the allocation of a task to the processing server 3200 has changed. When the allocation of a task has changed, the time point of the change is recorded as a candidate for a starting time point of a target range. At the time of determining the target range, the target range determination unit 2040 uses the recorded time point as a starting time point of the target range.

In addition, for example, the target range determination unit 2040 may collectively acquire pieces of allocation information at each of a plurality of time points for determining the target range. In this case, the target range determination unit 2040 compares the acquired plurality of pieces of allocation information with each other, and thereby calculating the time point at which the allocation of a task to the processing server 3200 has changed.

FIG. 13 is a diagram illustrating a configuration of allocation information in a table format. The allocation information illustrated in FIG. 13 is denoted as an allocation information table 300. The allocation information table 300 includes a time point of recording 302, a processing server ID 304, and a task ID 306. Each record in the allocation information table 300 indicates in the task ID 306 an ID of a task that is allocated to the processing server 3200 indicated by the processing server ID 304 at the time point of recording 302.

A termination time point of a target range determined by the target range determination unit 2040 of the fourth exemplary embodiment is the same as the termination time point of a target range determined by the target range determination unit 2040 of the third exemplary embodiment.

\<Flow of Processing\>

Figure 14:
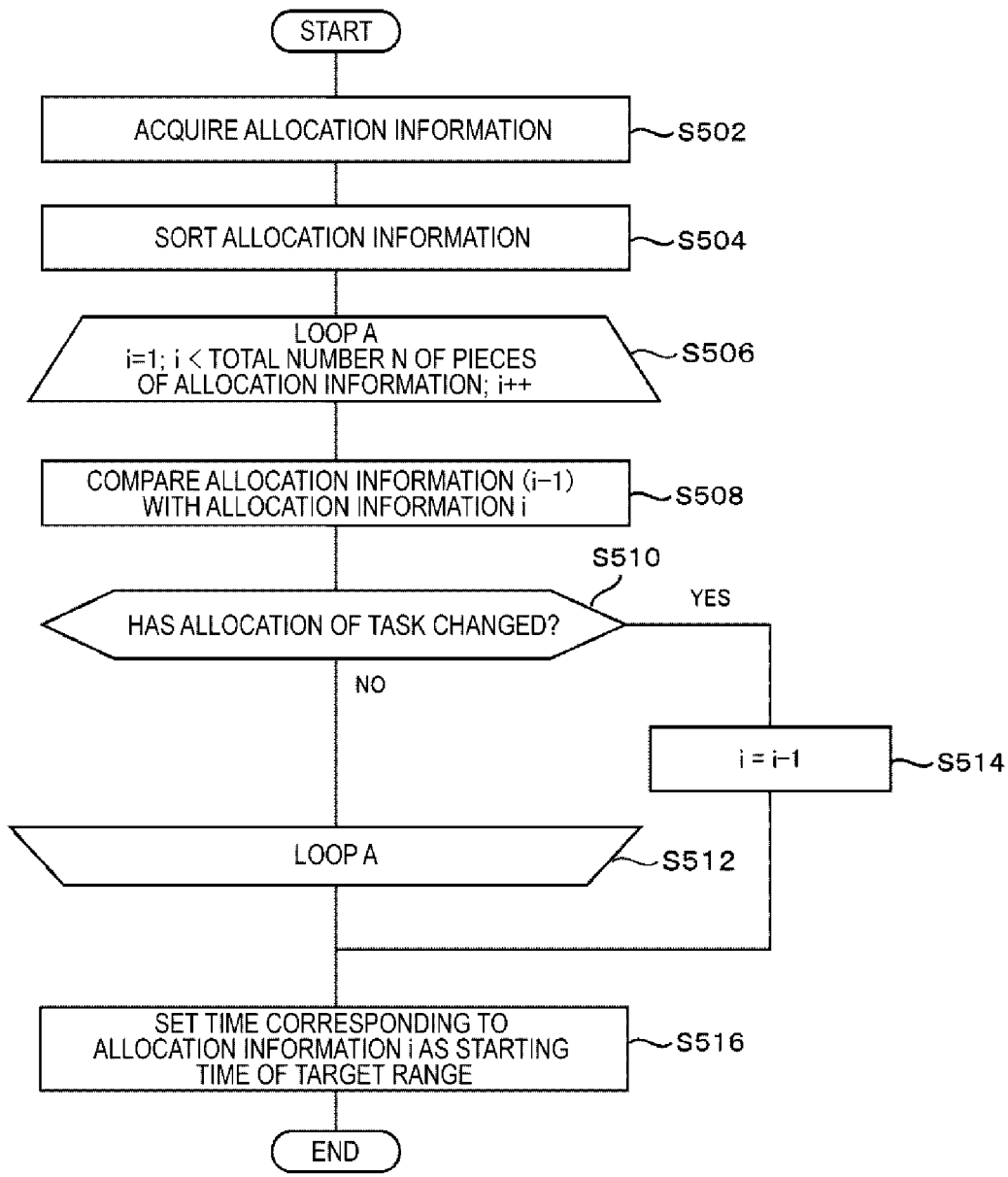
FIG. 14 is a flow chart illustrating a flow of a process performed by the abnormality detection apparatus according to the fourth exemplary embodiment.

FIG. 14 is a flow chart illustrating a flow of process performed by the abnormality detection apparatus 2000 according to the fourth exemplary embodiment. In step S502, the allocation information acquisition unit 2180 acquires allocation information. In step S504, the target range determination unit 2040 sorts the allocation information in order from that with the earliest time point. Step S506 to step S512 are loop processing A which is repeatedly performed while a condition is satisfied. Hereinafter, this condition is denoted as a loop condition A. In the loop condition A, a counter i is smaller than a total number N of pieces of allocation information. Here, an initial value of the counter i is set to 1. In addition, the counter i is incremented for every end of the loop processing A. Hereinafter, i-th allocation information is denoted as allocation information i. Allocation information with the earliest ranking is allocation information 0.

In step S506, the target range determination unit 2040 determines whether the loop condition A has been satisfied. When the loop condition A has been satisfied, the processing of FIG. 14 proceeds to step S508. On the other hand, when the loop condition A has not been satisfied, the processing of FIG. 14 proceeds to step S516.

In step S508, the target range determination unit 2040 compares allocation information (i−1) with the allocation information i. The processing of FIG. 14 branches in step S510 in accordance with a result of the comparison. As a result of the comparison between the two pieces of allocation information, when the allocation of a task has not changed, the processing of FIG. 14 proceeds to step S512. On the other hand, when the allocation of a task has changed, the processing of FIG. 14 proceeds to step S514.

Step S512 is an end of the loop processing A. Thus, the processing of FIG. 14 returns to step S506.

In step S514, the target range determination unit 2040 decrements the value of i by 1.

In step S516, the target range determination unit 2040 sets a time point corresponding to the allocation information i as a starting time point of a target range. For example, when allocation information is represented by the allocation information table 300, the time point indicated by the time point of recording 302 of the allocation information i is set as a starting time point of a target range.

<Operational Advantages>

According to the abnormality detection apparatus 2000 of the fourth exemplary embodiment, a target range is determined on the basis of allocation information. Here, when the allocation of a task to the processing server 3200 changes, a processing speed of a task that has being executed may change under the influence of the change of the allocation. For example, when a task is newly allocated to the processing server 3200, it is considered that a processing speed of a task that has being executed on the processing server 3200 may decrease. Therefore, before and after changing the allocation of a task, it is considered that a processing speed of a task may change even when the state of the task is normal.

According to the abnormality detection apparatus 2000 of the present exemplary embodiment, a target range is set with a time point on and after which the allocation of a task changes. Thus, a task speed distribution is calculated on the basis of a processing speed of a task after the allocation of the task changes. In this manner, a task speed distribution calculated by the distribution calculation unit 2060 is not influenced by a processing speed of a task before the allocation of the task changes. Therefore, a task speed distribution calculated by the abnormality detection apparatus 2000 of the present exemplary embodiment more accurately represents the distribution of a processing speed to be taken by a target task. As a result, the accuracy of determination performed by the abnormality determination unit 2080 increases.

[Fifth Exemplary Embodiment]

Figure 15:
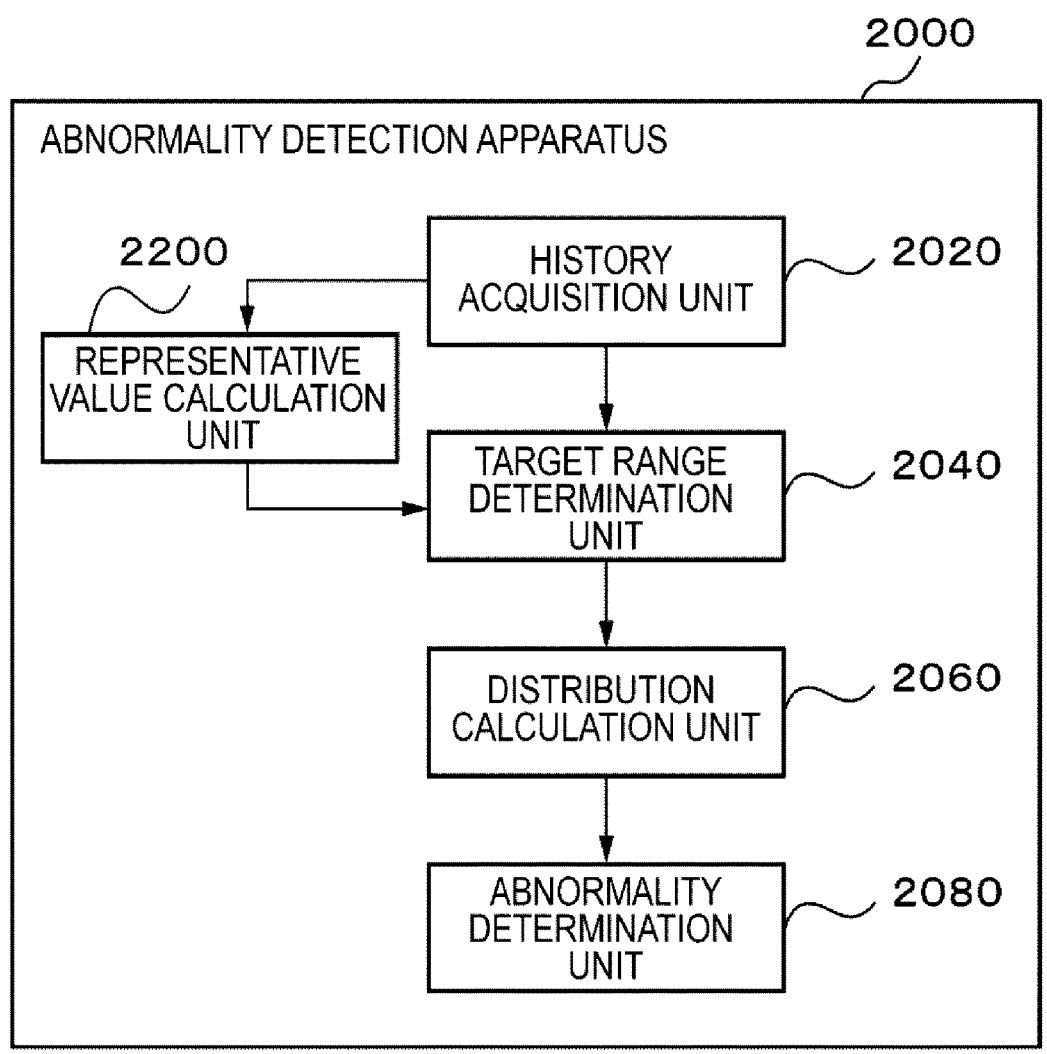
FIG. 15 is a block diagram illustrating an abnormality detection apparatus according to a fifth exemplary embodiment.

FIG. 15 is a block diagram illustrating an abnormality detection apparatus 2000 according to a fifth exemplary embodiment. In FIG. 15, an arrow indicates a flow of information. Further, in FIG. 15, each block represents a function-based configuration rather than a hardware-based configuration. The abnormality detection apparatus 2000 of the fifth exemplary embodiment is the same as the abnormality detection apparatus 2000 of the first or second exemplary embodiment except for the following description.

<Representative Value Calculation Unit 2200>

The abnormality detection apparatus 2000 of the fifth exemplary embodiment includes a representative value calculation unit 2200. The representative value calculation unit 2200 calculates a representative value of a processing speed of a task with respect to each of a plurality of periods. The representative value calculation unit 2200 calculates a representative value in each period using progress history information included in the period. For example, a representative value in a certain period is a statistic of a processing speed of a task corresponding to progress history information included in the period. The statistic is, for example, an average value, a median, or a mode value.

A target range determination unit 2040 of the fifth exemplary embodiment compares a representative value in a period closest to the current time point (hereinafter, a reference representative value) with other representative values. Next, the target range determination unit 2040 determines a period that is closest to the current time point among periods corresponding to a representative value significantly different from the reference representative value. The target range determination unit 2040 determines a target range so that the target range includes only a period after the determined period.

Figure 16:
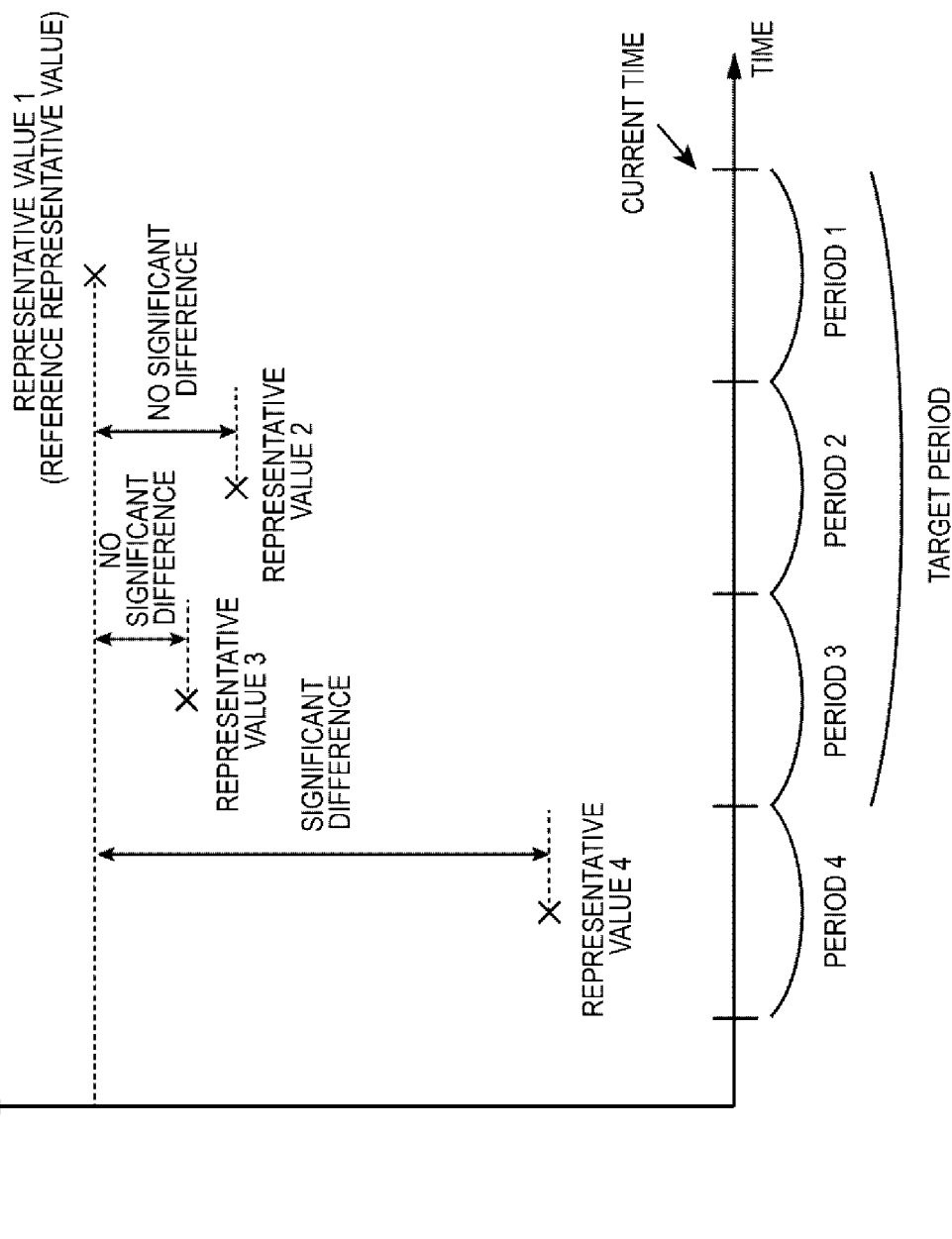
FIG. 16 is a graph conceptually illustrating processing by a target range determination unit.

FIG. 16 is a graph conceptually illustrating processing by the target range determination unit 2040. A vertical axis of the graph represents the size of a representative value, and a horizontal axis of the graph represents elapsed time. Suppose that a period closest to the current time point is a period 1. In addition, a difference from the current time point increases in the order of a period 2, a period 3, and a period 4. A representative value 1 in the period 1 is handled as a reference representative value.

In FIG. 16, a representative value 2 in the period 2 and a representative value 3 in the period 3 are not significantly different from the reference representative value. On the other hand, a representative value 4 in the period 4 is significantly different from the reference representative value. Thus, the target range determination unit 2040 determines a target period so that the target period includes only the period 3 and the subsequent period. By doing so, the target period includes the period 3, the period 2, and the period 1.

There are various methods of determining the above-mentioned period. For example, the target range determination unit 2040 may divide a period between the current time point and the time point of recording oldest in progress history information into the predetermined number of sections. In addition, for example, the target range determination unit 2040 may create a plurality of periods each of which has a length of w (w is a real number of 0 or greater) and in which an interval between starting time point of two adjacent periods is s (s is a real number of equal to or greater than w and greater than 0), with a starting point being the current time point.

<Flow of Processing>

Figure 17:
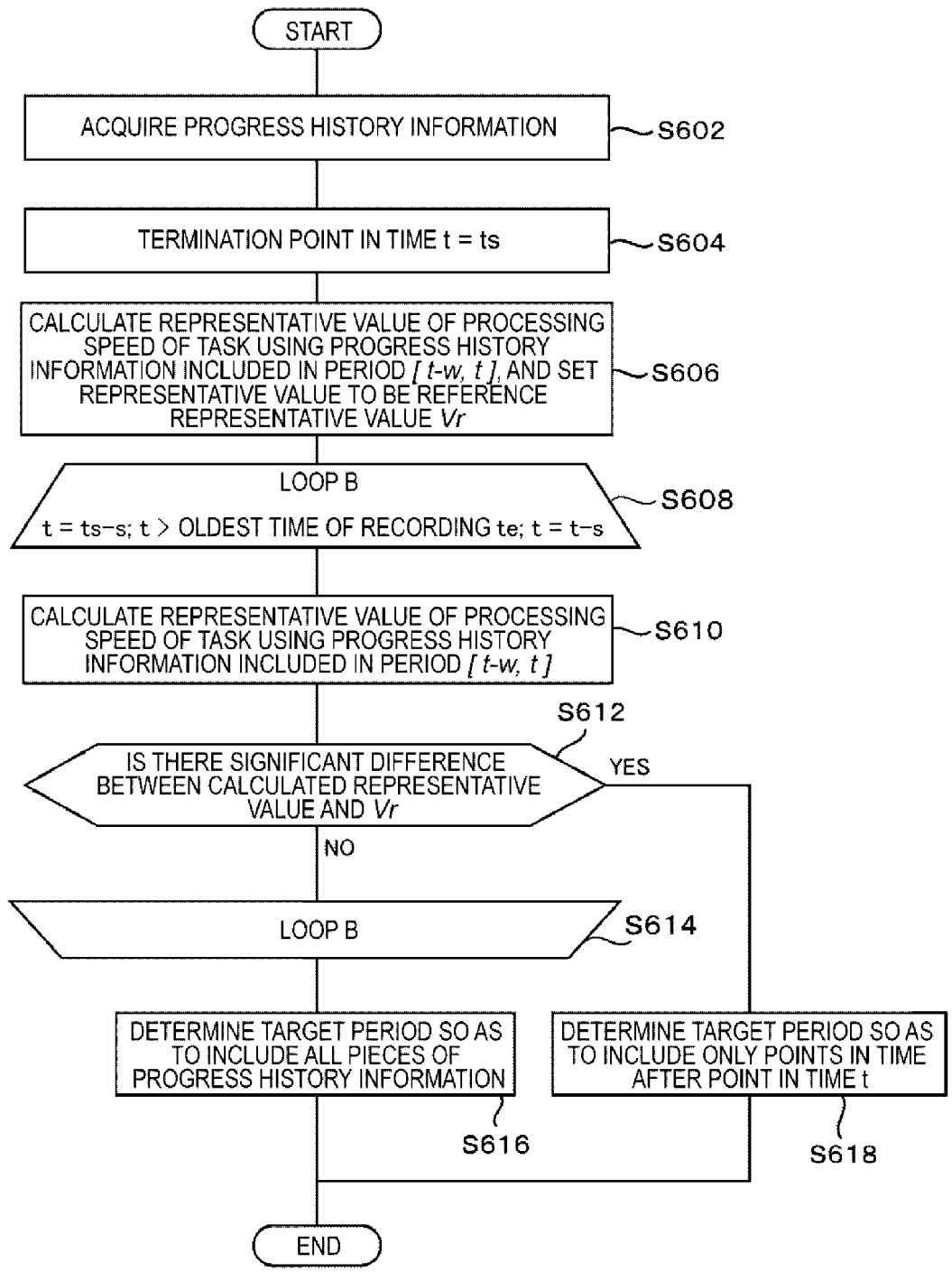
FIG. 17 is a flow chart illustrating a flow of a process performed by the abnormality detection apparatus according to the fifth exemplary embodiment.

FIG. 17 is a flow chart illustrating a flow of process performed by the abnormality detection apparatus 2000 according to the fifth exemplary embodiment. In step S602, a history acquisition unit 2020 acquires progress history information. In step S604, the target range determination unit 2040 sets an initial value is as the termination time point t of a period. For example, ts denotes the current time point. In step S606, the representative value calculation unit 2200 calculates a representative value of a task speed using progress history information included in a period [t−w, t] in which t−w denotes the starting time point and t denotes the termination time point. The target range determination unit 2040 sets this representative value as a reference representative value Vr.

Step S608 to step S614 is a loop processing B which is repeatedly performed while a predetermined condition is satisfied. The above-mentioned predetermined condition (hereinafter, a loop condition B) is t>te. Here, te denotes the oldest time point of recording among time points of recording indicated by the progress history information. In addition, an initial value of t in the loop processing B is ts−s. Here, s denotes a positive real number. Further, the value of t is decremented by s every time the loop processing B is performed. In step S608, the target range determination unit 2040 determines whether or not the loop condition B has been satisfied. When the loop condition B has been satisfied, the processing of FIG. 17 proceeds to step S610. On the other hand, when the loop condition B has not been satisfied, the processing of FIG. 17 proceeds to step S616.

In step S610, the target range determination unit 2040 calculates a representative value of a task speed using progress history information included in a period [t−w, t] in which t−w denotes the starting time point and t denotes the termination time point. In step S612, the target range determination unit 2040 determines whether or not there is a significant difference between the representative value calculated in step S610 and the reference representative value Vr. When there is no significant difference between the two values, the processing of FIG. 17 proceeds to step S614. On the other hand, when there is a significant difference between the two values, the processing of FIG. 17 proceeds to step S618.

Step S614 is the end of the loop processing B. The processing of FIG. 17 proceeds to step S608.

Step S616 is a process that is performed when there is no significant difference between the reference representative value and each of all representative values calculated. For example, the target range determination unit 2040 sets a period including time points of recording of all pieces of progress history information as a target period in step S616.

In step S618, the target range determination unit 2040 determines a target period so that the target period includes only time points after t. For example, the target period is a period [t, ts].

<Operational Advantages>

According to the present exemplary embodiment, it is performed to determine a period having a significant difference in a processing speed of a task compared to a processing speed of a task in a period close to the current time point, and a target period is determined so as not to include a period before the period. Here, the processing speed of the task may change, even when the task is normal and there is no change in the allocation of the task. For example, when processing contents of the task change, it is considered that the processing speed of the task may change. For example, this is a case where the processing of the task changes from processing of analyzing data to processing of writing data.

According to the present exemplary embodiment, it is possible to detect that a processing speed of a task has changed significantly, regardless of whether or not the allocation of the task changes. The target range determination unit 2040 determines a target period so that the target period does not include a period before the time point at which the processing speed of the task changes significantly. In this manner, according to the present exemplary embodiment, a task speed distribution is calculated using only progress history information included in a period in which a processing speed of a task does not change significantly. Therefore, the task speed distribution calculated by the abnormality detection apparatus 2000 of the present exemplary embodiment more accurately represent the distribution of a processing speed to be taken by a target task. As a result, the accuracy of determination performed by the abnormality determination unit 2080 increases.

[Sixth Exemplary Embodiment]

Figure 18:
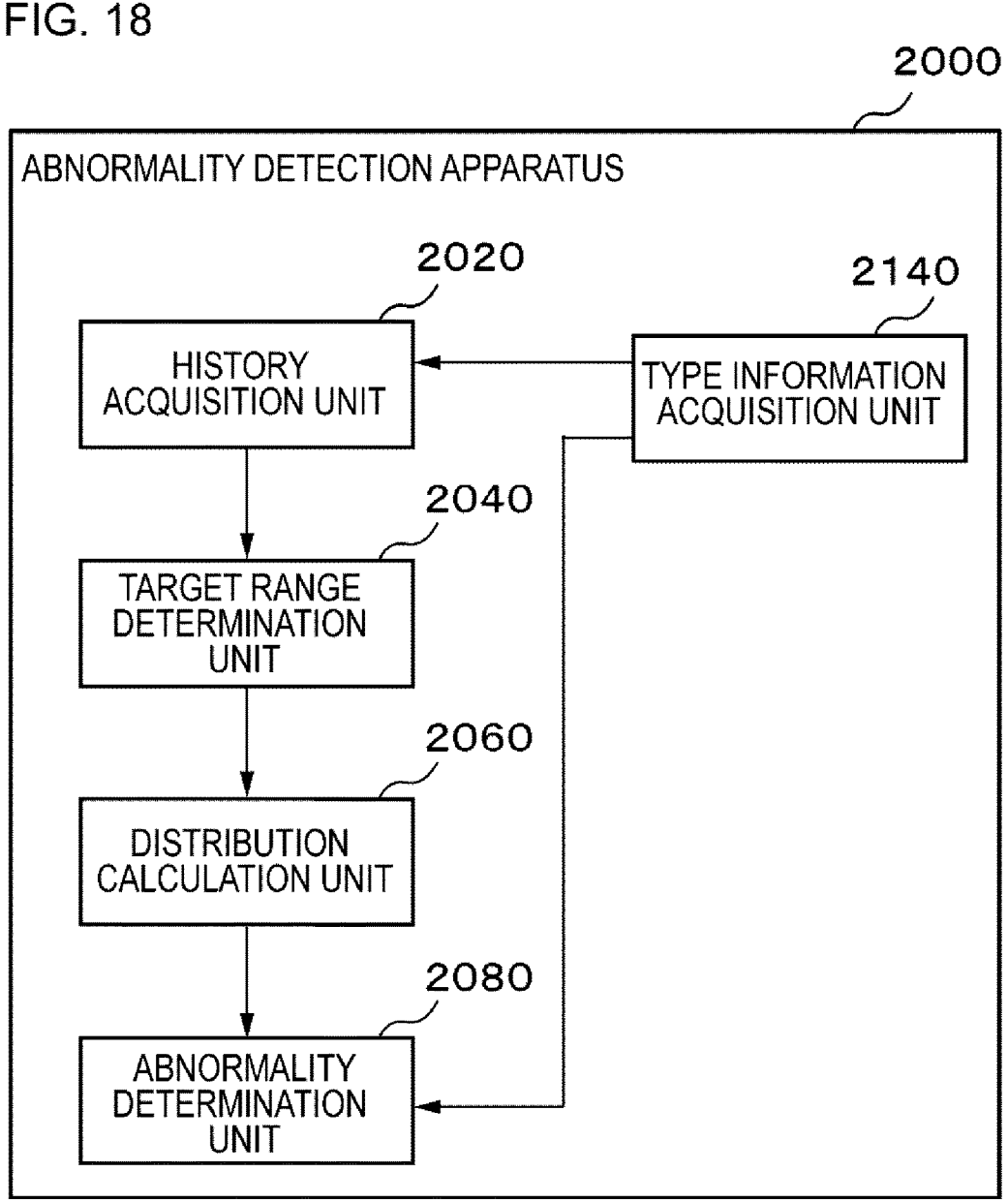
FIG. 18 is a block diagram illustrating an abnormality detection apparatus according to a sixth exemplary embodiment.

FIG. 18 is a block diagram illustrating an abnormality detection apparatus 2000 according to a sixth exemplary embodiment. In FIG. 18, an arrow indicates a flow of information. Further, in FIG. 18, each block represents a function-based configuration rather than a hardware-based configuration. The abnormality detection apparatus 2000 of the sixth exemplary embodiment is the same as the abnormality detection apparatus 2000 of any of the first to fifth exemplary embodiments.

In the sixth exemplary embodiment, a task type is allocated to each task. For example, the same task type is allocated to tasks generated from the same job. A distribution calculation unit 2060 of the sixth exemplary embodiment calculates a task speed distribution using only progress history information regarding a task corresponding to the same task type as a target task. For this reason, the abnormality detection apparatus 2000 of the sixth exemplary embodiment includes a type information acquisition unit 2140. The type information acquisition unit 2140 acquires a task type corresponding to a task.

For example, suppose that there are three tasks T1, T2, and T3 that have a task type G1 and there are two tasks T4 and T5 that have a task type G2. When a target task is any one of T1, T2, and T3, the distribution calculation unit 2060 calculates a task speed distribution using only progress history information regarding T1, T2, and T3 that correspond to the task type G1. On the other hand, when the target task is T4 or T5, the distribution calculation unit 2060 calculates a task speed distribution using only progress history information regarding T4 and T5 that correspond to the task type G2.

In addition, the target range determination unit 2040 may determine a target range in accordance with a task type of a target task. For example, suppose that the target range determination unit 2040 sets the predetermined period acquired by a predetermined period acquisition unit 2160 as a length of a target period, as described in the third exemplary embodiment. In this case, the predetermined period acquisition unit 2160 acquires the predetermined period according to the task type of the target task. Here, it is considered that a length of a period in which a task is in one state (for example, a state where data is read) depends on a task type of the task. For example, it is considered that there may exist a task type requiring a long time for the reading of data, a task type requiring a long time for the analytical processing of data, and the like. Thus, a period in which a task of each task type stays in the same state is predicted with respect to the task type, and the predicted value is set as a predetermined period, and thus it is possible to set a predetermined period so as to be suitable for each task type. For example, the predicted value can be calculated by test-running a task of each task type.

<Operational Advantages>

According to the present exemplary embodiment, a task speed distribution is calculated using only progress history information regarding a task corresponding to the same task type as a target task. Here, in the case of tasks corresponding to the same task type, it is considered that there is a small difference in a processing speed therebetween in a normal occasion. On the other hand, in the case of tasks corresponding to different task types, it is possible that there is significant difference between the processing speeds of the tasks even in a normal occasion. According to the present exemplary embodiment, a task speed distribution is calculated using only progress history information regarding a task corresponding to the same task type as a target task, and thus the task speed distribution more accurately represents a range of a value to be taken by a processing speed of the target task. Therefore, according to the present exemplary embodiment, the accuracy of determination performed by an abnormality determination unit 2080 increases compared to a case where a task speed distribution is calculated without considering a task type.

[Seventh Exemplary Embodiment]

Figure 19:
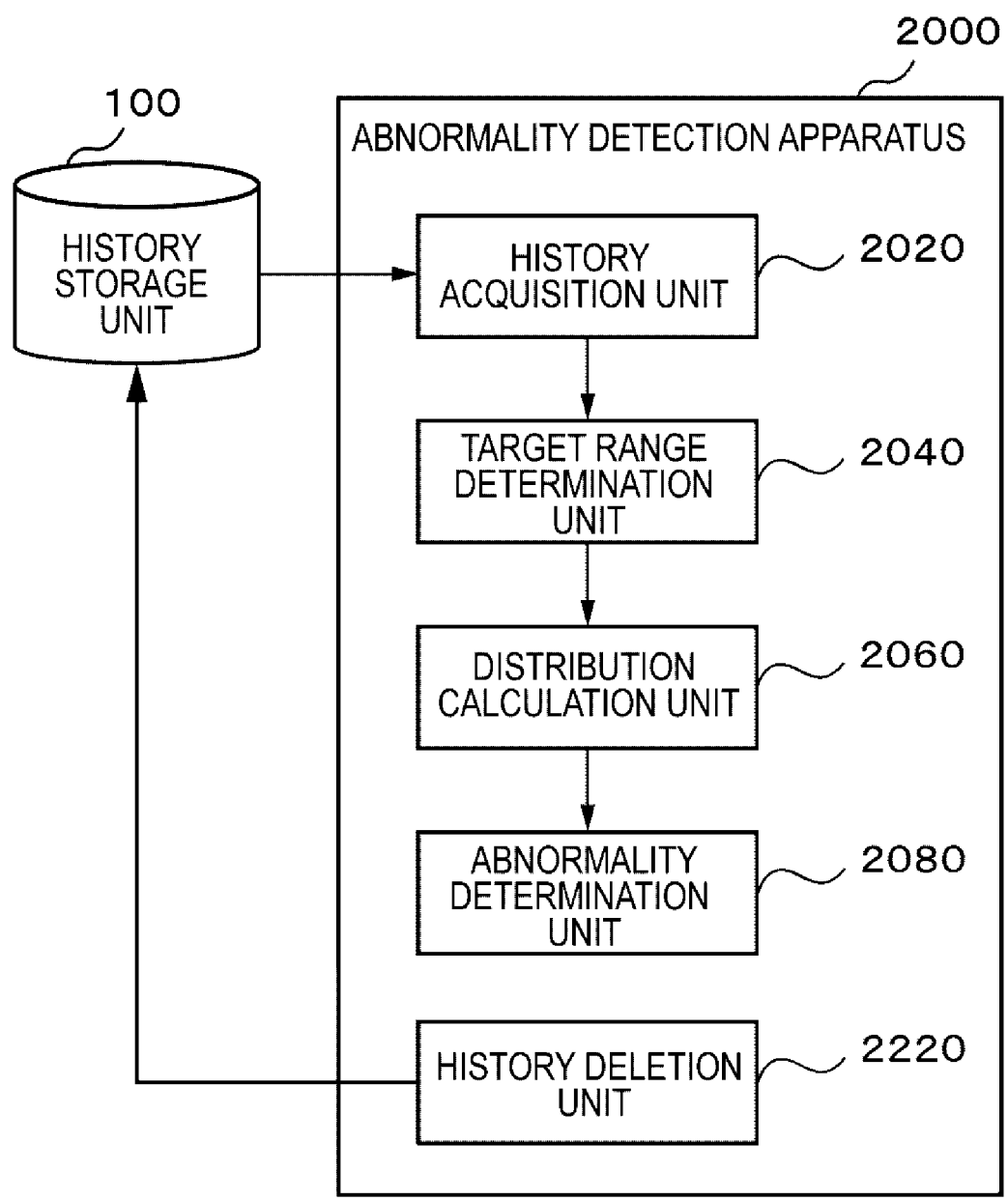
FIG. 19 is a block diagram illustrating an abnormality detection apparatus according to a seventh exemplary embodiment.

FIG. 19 is a block diagram illustrating an abnormality detection apparatus 2000 according to a seventh exemplary embodiment. In FIG. 19, an arrow indicates a flow of information. Further, in FIG. 19, each block represents a function-based configuration rather than a hardware-based configuration. The abnormality detection apparatus 2000 of the seventh exemplary embodiment is the same as the abnormality detection apparatus 2000 of any of the first to sixth exemplary embodiments except for the following description.

In the seventh exemplary embodiment, progress history information is stored in a history storage unit 100. The history storage unit 100 may be provided inside the abnormality detection apparatus 2000, or may be provided outside the abnormality detection apparatus. A history acquisition unit 2020 of the seventh exemplary embodiment acquires progress history information from the history storage unit 100.

The abnormality detection apparatus 2000 of the seventh exemplary embodiment includes a history deletion unit 2220. The history deletion unit 2220 deletes progress history information having the time point of recording that is not included in a target range determined by a target range determination unit 2040, from the history storage unit 100.

<Operational Advantages>

According to the present exemplary embodiment, progress history information having the time point of recording not included in a target range is deleted from the history storage unit 100. Thereby, it is possible to prevent the number of pieces of progress history information stored in the history storage unit 100 from monotonously increasing. As a result, the number of pieces of progress history information acquired by the history acquisition unit 2020 and the number of pieces of progress history information processed when the target range determination unit 2040 determines a target range are reduced, and thus a time required for the processes performed by the history acquisition unit 2020 and the target range determination unit 2040 reduces.

In addition, it is possible to reduce the storage capacity of the history storage unit 100 for the same reason. Therefore, for example, when the history storage unit 100 is provided inside the abnormality detection apparatus 2000, it is possible to reduce the size or cost of the abnormality detection apparatus 2000. Even when the history storage unit 100 is provided outside the abnormality detection apparatus 2000, it is possible to reduce the cost of the entire system including the abnormality detection apparatus 2000 and a distribution system 3000.

EXAMPLE 3

Figure 20:
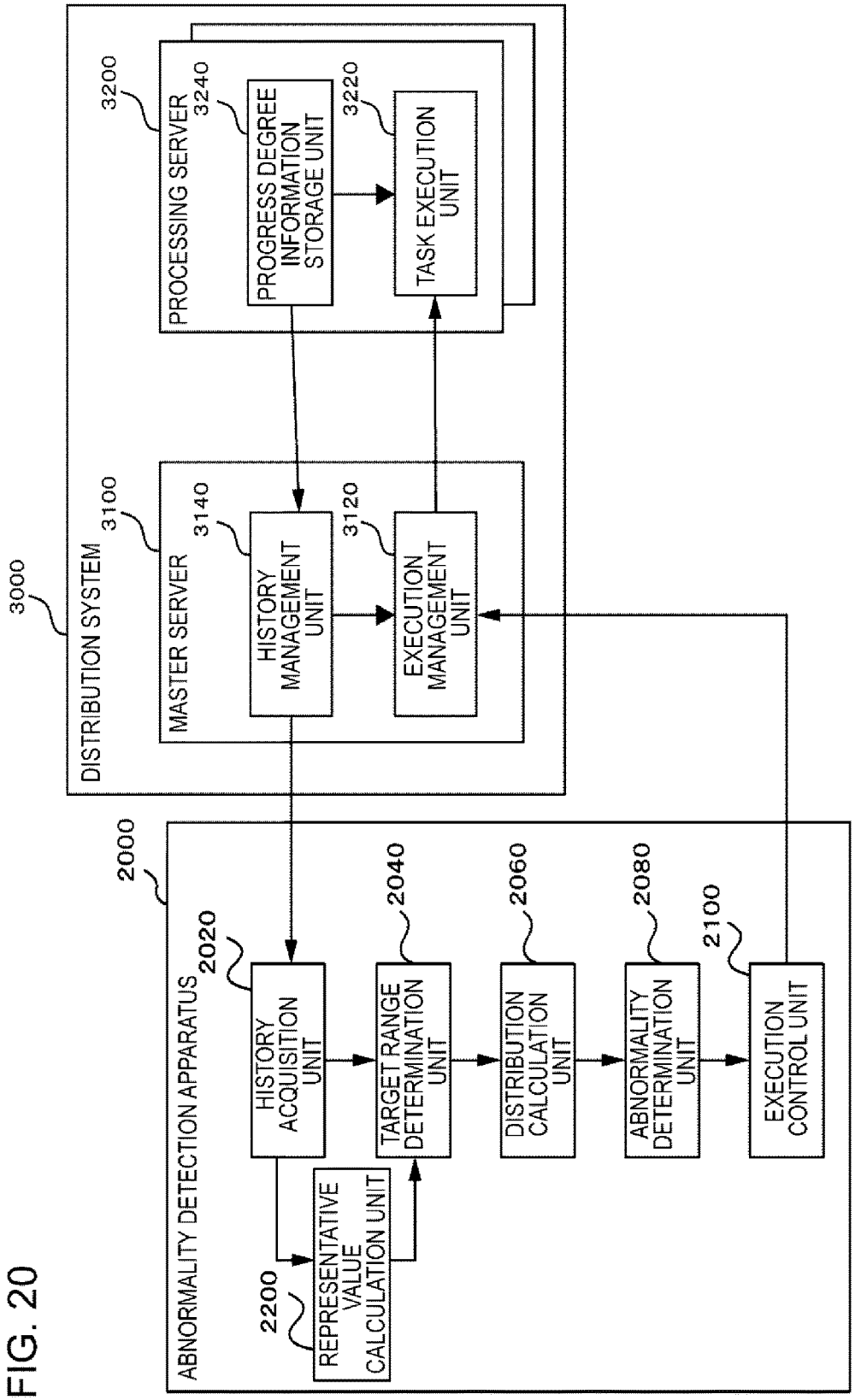
FIG. 20 is a block diagram illustrating an allocation determination apparatus according to Example 3 together with a usage environment thereof.

A specific operation of an abnormality detection apparatus 2000 will be described below using an example. Note that, the following description merely an example of an operation of the abnormality detection apparatus 2000, and the abnormality detection apparatus 2000 of the present invention is not limited to the following example. FIG. 20 is a block diagram illustrating an abnormality detection apparatus 2000 according to Example 3 together with a usage environment thereof. In FIG. 20, an arrow indicates a flow of information. Further, in FIG. 20, each block represents a function-based configuration rather than a hardware-based configuration.

In Example 3, a distribution system 3000 includes a master server 3100. The master server 3100 includes an execution management unit 3120 and a history management unit 3140. The execution management unit 3120 manages the execution of a task. Specifically, the execution management unit 3120 performs processing such as the allocation of a new task to a processing server 3200, the stopping or restart of the execution of the task allocated to the processing server 3200, or the allocation of the task allocated to the processing server 3200 to another processing server 3200. A history management unit 3140 collects progress degree information from each processing server 3200. A history of the collected progress degree information is managed as progress history information. Here, the progress degree information represents the degree of progress of a task at a certain time point.

The processing server 3200 includes a task execution unit 3220 and a progress degree information storage unit 3240. The task execution unit 3220 executes a task. For example, the task execution unit 3220 may be a process, a thread, or a virtual machine. The processing server 3200 may include a plurality of tasks execution units 3220. Note that, the task execution unit 3220 may execute a plurality of tasks. The progress degree information storage unit 3240 stores progress degree information regarding a task which is being executed on the processing server 3200 including the progress degree information storage unit 3240.

A history acquisition unit 2020 of Example 3 acquires progress history information from the history management unit 3140. In addition, the abnormality detection apparatus 2000 of Example 3 includes the representative value calculation unit 2200 described in the fifth exemplary embodiment. The target range determination unit 2040 calculates a target range by the method described in the fifth exemplary embodiment. A distribution calculation unit 2060 calculates a task speed distribution using only progress history information included in a target range determined by the target range determination unit 2040, among pieces of the progress history information acquired by the history acquisition unit 2020. The abnormality determination unit 2080 determines whether or not a processing speed of a target task is abnormal. An execution control unit 2100 receives a result of the determination of the abnormality determination unit 2080 in order to control the execution of a task. In the present example, the execution control unit 2100 transmits an instruction for controlling the execution of a task to the execution management unit 3120. The execution management unit 3120 having received the instruction controls the execution of the task. Note that, the execution control unit 2100 may directly control the execution of the task without intermediation by the execution management unit 3120.

Figure 21:
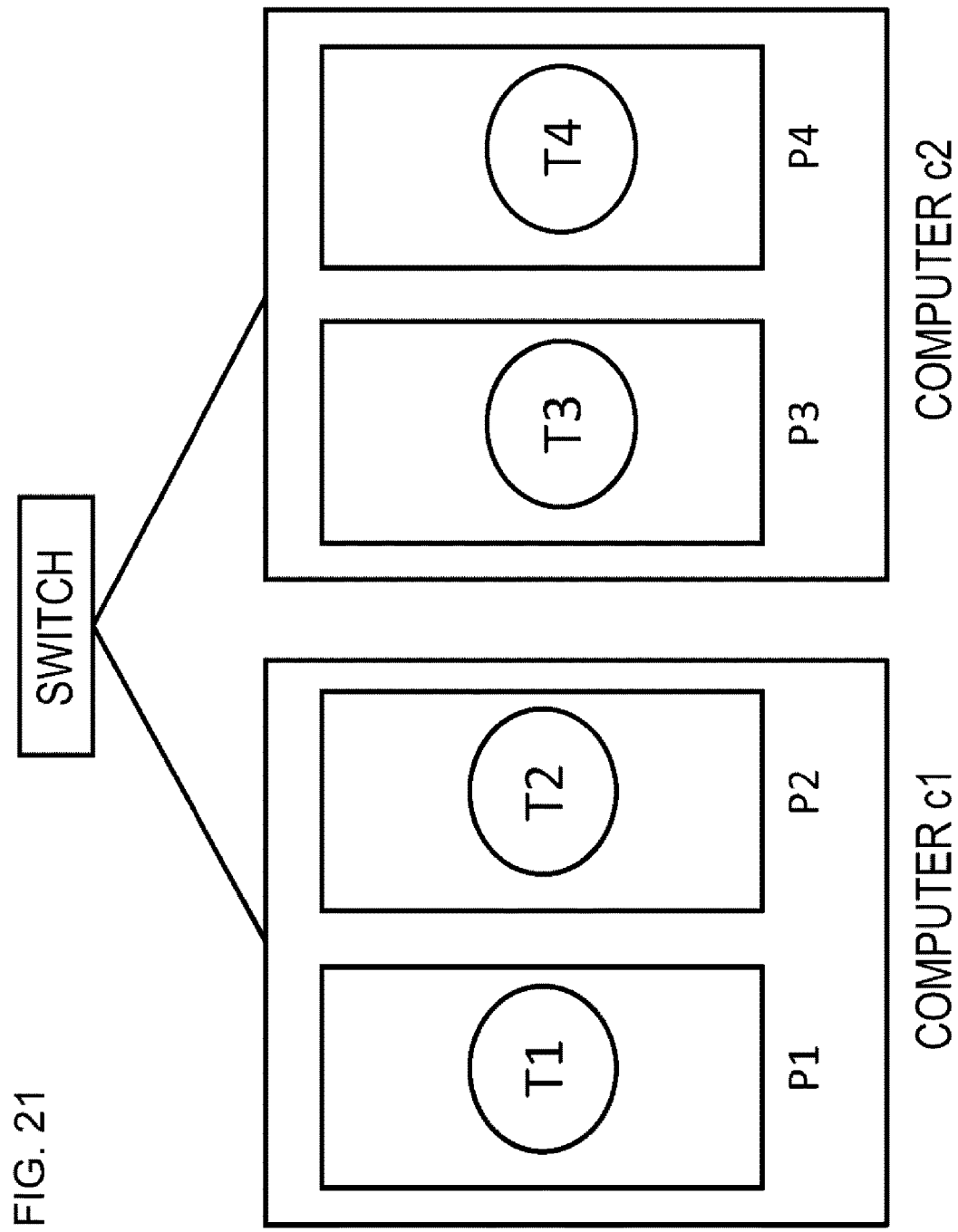
FIG. 21 is a diagram illustrating a processing server included in a distribution system of Example 3.

FIG. 21 is a diagram illustrating the processing server 3200 included in the distribution system 3000 of Example 3. The distribution system 3000 of Example 3 includes computers c1 and c2 as the processing server 3200. The computers c1 and c2 are connected to each other through a network switch. The computer c1 has processes P1 and P2 as the task execution unit 3220. In addition, the computer c2 has processes P3 and P4 as the task execution unit 3220. The processes P1, P2, P3, and P4 execute tasks T1, T2, T3, and T4, respectively. Note that, in FIG. 21, the master server 3100 and the progress degree information storage unit 3240 are omitted.

The computers c1 and c2 monitor the state of a task being in execution, generate progress degree information regarding the task being in execution, and store the generated information in the progress degree information storage unit 3240. FIG. 22 is a diagram collectively illustrating pieces of progress degree information stored in the progress degree information storage units 3240 of the computers c1 and c2. Here, the progress degree information in the present example represents a processing progress rate per second of a task. For example, a record in a first row of FIG. 22 indicates that a processing progress rate per second of the task T1 is 5% at the time point of recording of 1:30:01. Here, the processing progress rate per second is also a value indicating a processing speed of the task.

The progress degree information stored in the progress degree information storage units 3240 of the computers c1 and c2 is collected by the history management unit 3140 included in the master server 3100. FIG. 23 is a diagram illustrating progress history information managed by the history management unit 3140. For example, a record in a first row of FIG. 23 indicates that a processing progress rate per second of the task T1 is 50% at the time point of recording of 1:28:02. Note that, as described above, the processing progress rate per second is also a value indicating a processing speed. Therefore, in the present example, the progress history information directly indicates a processing speed of a task.

A process performed by the abnormality detection apparatus 2000 will be described below. The history acquisition unit 2020 acquires progress history information illustrated in FIG. 23 from the history management unit 3140. The target range determination unit 2040 determines a target range by the method described in the fifth exemplary embodiment. An initial value t is set to 1:31:00, a window width w is set to 0:01:00, and a step width s is set to 0:01:00. The target range determination unit 2040 calculates an average value of a processing progress rate per second indicated by progress history information included in a period, as a representative value of the period. In addition, when a certain representative value is equal to or more than the double of a reference representative value, the target range determination unit 2040 determines that there is a significant difference between the representative value and the reference representative value.

The first period for which the target range determination unit 2040 calculates a representative value is [1:30:00, 1:31:00]. Progress history information in which the time point of recording is included in the period are the records 5 to 8 of FIG. 23. Therefore, the target range determination unit 2040 calculates a representative value using processing progress rates per second shown in the four records. The representative value is set to 16.25%/s. The representative value serves as a reference representative value.

The second period is [1:29:00, 1:30:00]. Progress history information included in the period are the records 3 and 4 of FIG. 23. Thus, the target range determination unit 2040 calculates a representative value using processing progress rates per second shown in the two records. The representative value is set to 22.5%/s. Comparing the representative value with a reference representative value, it is 22.5/16.25=approximately 1.38 times. Accordingly, the target range determination unit 2040 determines that there is no significant difference between the two values.

The third period is [1:28:00, 1:29:00]. Progress history information included in the period are the records 1 and 2 of FIG. 23. Thus, the target range determination unit 2040 calculates a representative value using processing progress rates per second shown in the two records. The representative value is set to 47.5%/s. Comparing the representative value with a reference representative value, it is 47.5/16.25=approximately 2.92 times. Accordingly, the target range determination unit 2040 determines that there is a significant difference between the two values. As a result, the target range determination unit 2040 sets a target period so as to include the time point after the third period. In the present example, the target range determination unit 2040 sets a period [1:29:00, 1:31:00] including the first period and the second period as the target period.

Figure 24:
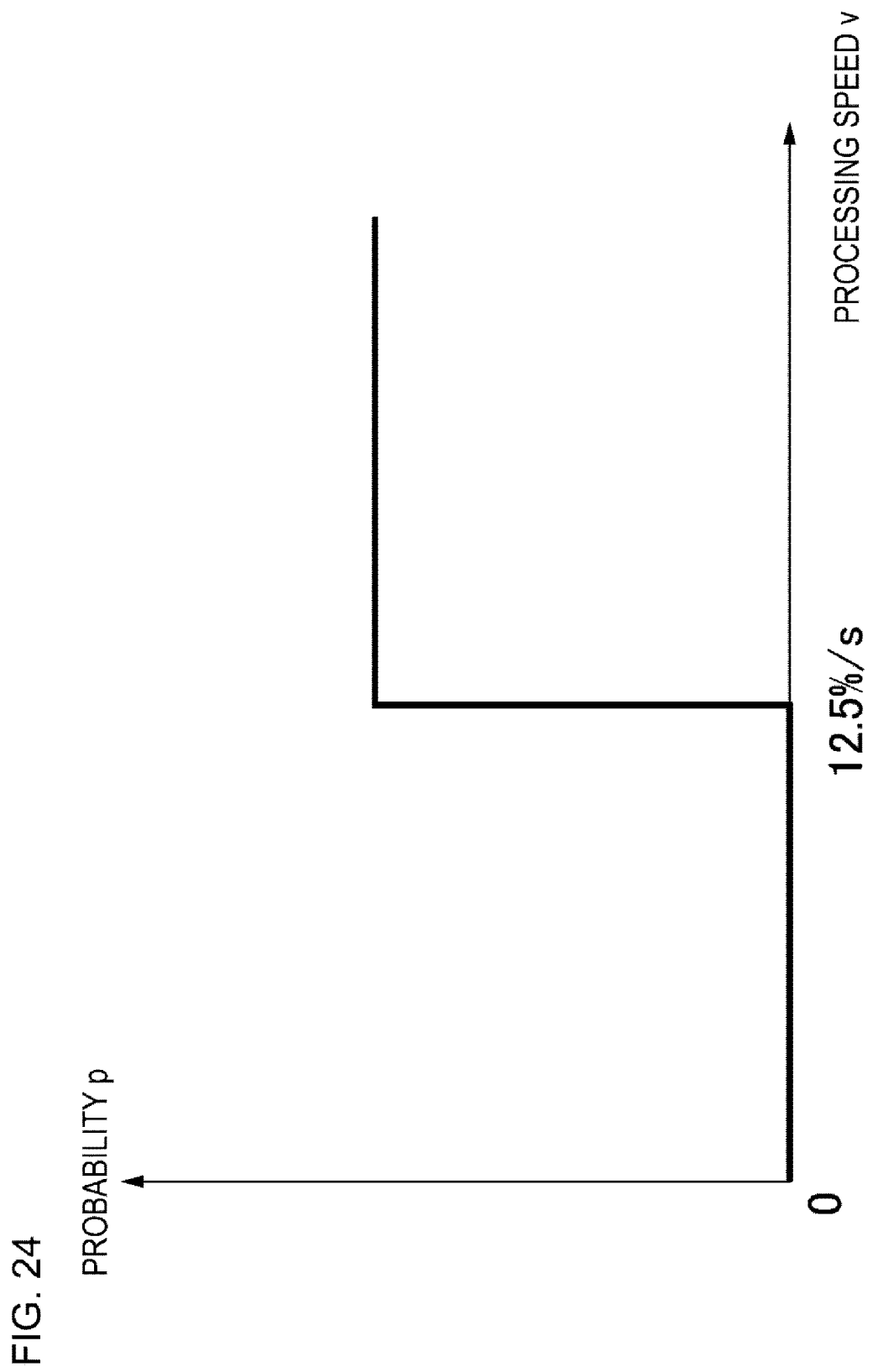
FIG. 24 is a graph illustrating a task speed distribution which is calculated by a distribution calculation unit.

The distribution calculation unit 2060 calculates a task speed distribution using progress history information included in the target period described above. The pieces of progress history information included in the target period are the records 3 to 8 of FIG. 23. In the present example, the distribution calculation unit 2060 calculates a task speed distribution by the method described in Example 1. Here, the relation of $\alpha=0.5$ is assumed. In addition, a greatest value (Vm) is 25%/s, which value is among processing speeds of a task shown in the progress history information included in the target period. Accordingly, the value of a threshold value D is set to $\alpha \cdot Vm = 0.5 \cdot 25 = 12.5$. Regarding a processing speed v of a task, a probability distribution is calculated as a task speed distribution where a probability satisfying the relation of "$0 \leq v \leq 12.5$" is 0 and a probability satisfying the relation of "$v > 12.5$" is 1. FIG. 24 is a graph illustrating a task speed distribution which is calculated by the distribution calculation unit 2060.

The abnormality determination unit 2080 sets each of the tasks T1 to T4 being in execution as a target task, compares each of the tasks with the task speed distribution, and determines whether or not a processing speed is abnormal. Note that, suppose that the processing speeds of the respective tasks at the time of the determination are represented by the records 5 to 8 of FIG. 23. Only the processing speed of the task T1 among the tasks T1 to T4 is a speed with an occurrence probability being 0 in the task speed distribution. Accordingly, the abnormality determination unit 2080 determines that the processing speed of the task T1 is abnormal.

The execution control unit 2100 transmits an instruction for controlling the execution of the task T1 to the execution management unit 3120. The execution management unit 3120 having received the instruction controls the execution of the task T1. For example, the execution management unit 3120 restarts the task T1 on the process P1.

EXAMPLE 4

A specific operation of an abnormality detection apparatus 2000 will be described below using another example. The example shown in the present example is also an example of an operation of the abnormality detection apparatus 2000, and the abnormality detection apparatus 2000 of the present invention is not limited to the following example. Configurations of the abnormality detection apparatus 2000 and a distribution system 3000 in Example 4 are assumed to be the same as those in the case of Example 3.

FIG. 25 is a diagram collectively illustrating pieces of progress degree information stored in progress degree information storage units 3240 of the computers c1 and c2. Here, the progress degree information in the present example indicates a predicted value or a result value of a task completion time (remaining required time until the processing of a task is completed). The abnormality detection apparatus 2000 of the present example uses the predicted value or the result value of the task completion time as a value representing a processing speed of the task. In addition, FIG. 26 is a diagram illustrating progress history information which is managed by a history management unit 3140. Here, tasks T1', T2', T3', and T4' are tasks that were executed in the past.

FIG. 27 illustrates progress history information included in a target range determined by the target range determination unit 2040. Here, the target range determination unit 2040 determines the target range in the same manner as in the case of Example 3.

A distribution calculation unit 2060 calculates a task speed distribution using a task completion time shown in the progress history information of FIG. 27 as a sample. In Example 4, a model of the task speed distribution calculated by the distribution calculation unit 2060 is a Poisson distribution. Here, the distribution calculation unit 2060 sets a width of a bin of a histogram used for the calculation of the Poisson distribution to 5 seconds and sets a parameter $\lambda$ to 1.

First, the distribution calculation unit 2060 generates a histogram using the task completion time shown in the progress history information as a sample. A bin (bin 1) having the range of the task completion time of [0, 5) includes T'4 and T4, and thus the number of elements of the bin 1 is two. A bin (bin 2) having the range of the task completion time of [5, 10) includes T'3, T2, and T3, and thus the number of elements of the bin 2 is three. There are no elements included in a bin (bin 3) having the range of the task completion time of [10, 15), and thus the number of elements of the bin 3 is zero. There are no elements included in a bin (bin 4) having the range of the task completion time of [15, 20), and thus the number of elements of the bin 4 is zero. A bin (bin 5) having the range of the task completion time of [20, 25) includes T1, and thus the number of elements of the bin is one.

Next, the distribution calculation unit 2060 determines a bin number k_mode corresponding to a mode value of the histogram. In this case, the bin 2 has the largest number of elements, and thus the relation of k_mode=2 is established. Next, the distribution calculation unit 2060 calculates a Poisson distribution $P(\lambda, k)$ (here, k=max(k'−k_mode, 0)) as a task speed distribution. Since the relation of $\lambda=1$ is established, a Poisson distribution of $P(1, k)$ is calculated.

An abnormality determination unit 2080 determines whether or not a processing speed of a task is abnormal with handling each of the tasks T1 to T4 being in execution as target tasks by using the above-mentioned Poisson distribution $P(1, k)$. In the present example, when an occurrence probability of a processing speed of a target task is equal to or less than 0.1 in a task speed distribution, the abnormality determination unit 2080 determines that the processing speed of the target task is abnormal.

Since a task completion time of the task T1 is 20 seconds, the relation of bin number k'=5 is established. Accordingly, the relation of k=max(k'−k_mod, 0))=max(5−2, 0)=3 is established. Therefore, an occurrence probability of the task completion time of the task T1 satisfies the relation of $P(1, 3)$=approximately 0.06. This value is smaller than 0.1, and thus the abnormality determination unit 2080 determines that the processing speed of the task T1 is abnormal. Accordingly, similarly to the case of Example 3, an execution control unit 2100 transmits an instruction for controlling the execution of the task T1 to an execution management unit 3120.

Occurrence probabilities of task completion times of the tasks T2 to T4 is approximately 0.37, approximately 0.37, and approximately 0.37, respectively, which are greater than a threshold value 0.1. Thus, the abnormality determination unit 2080 determines that the processing speeds of the tasks are not abnormal.

EXAMPLE 5

Figure 28:
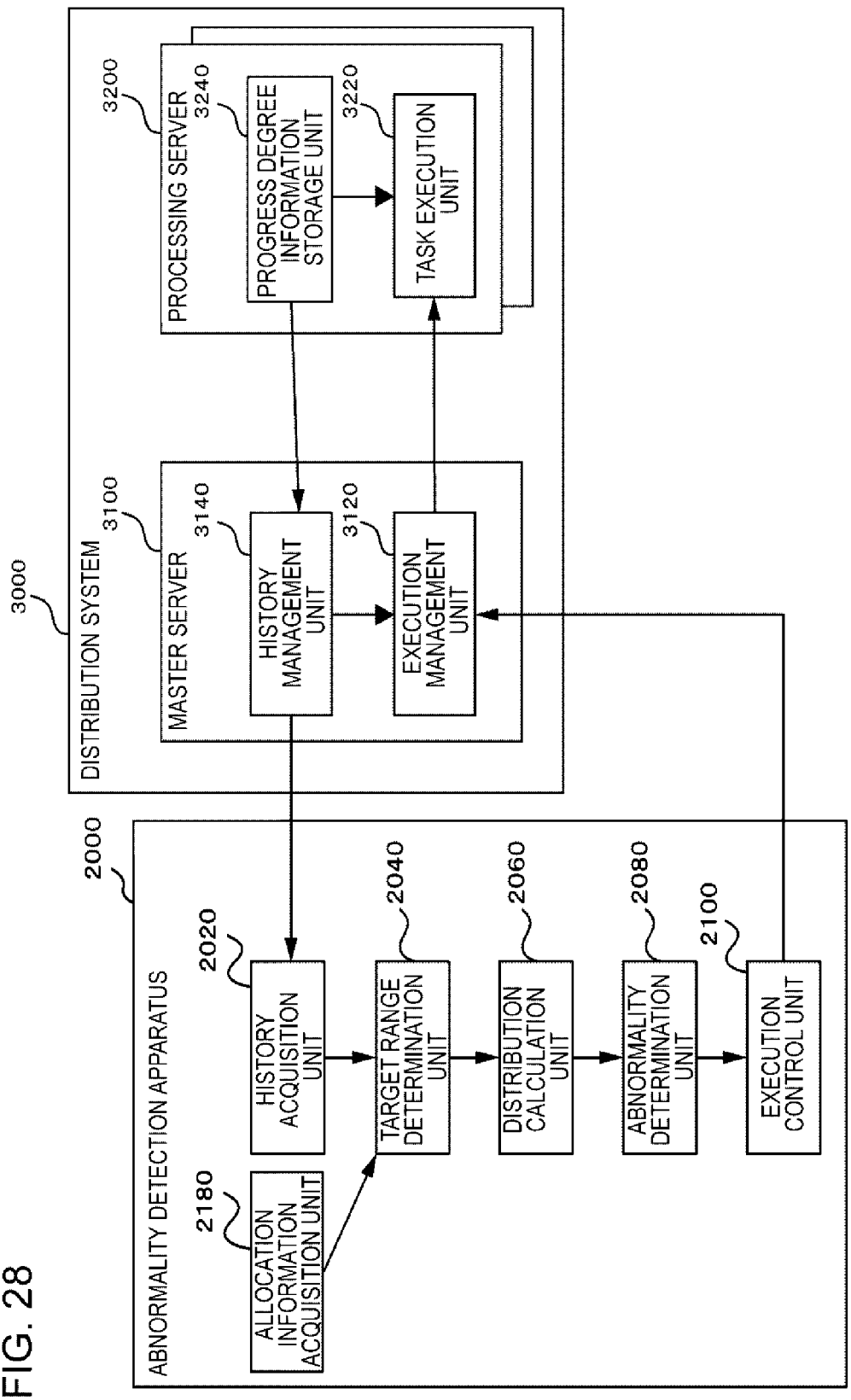
FIG. 28 is a block diagram illustrating an abnormality detection apparatus according to Example 5 together with a usage environment thereof.

A specific operation of an abnormality detection apparatus 2000 will be described below using another example. The example shown in the present example is also an example of an operation of the abnormality detection apparatus 2000, and the abnormality detection apparatus 2000 of the present invention is not limited to the following example. FIG. 28 is a block diagram illustrating the abnormality detection apparatus 2000 according to Example 5 together with a usage environment thereof. In FIG. 28, an arrow indicates a flow of information. Further, in FIG. 28, each block represents a function-based configuration rather than a hardware-based configuration. A distribution system 3000 of FIG. 28 is the same as the distribution system 3000 of FIG. 20, and is the same as the distribution systems 3000 in Examples 3 and 4.

The abnormality detection apparatus 2000 in Example 5 includes the allocation information acquisition unit 2180 described in the fourth exemplary embodiment. A target range determination unit 2040 in Example 5 calculates a target range by the method described in the fourth exemplary embodiment. Note that, allocation information in the present example represents a transition of the number of jobs allocated to the distribution system 3000. FIG. 29 is a diagram illustrating allocation information acquired by the allocation information acquisition unit 2180.

FIG. 21 illustrates a processing server included in the distribution system 3000 in the same manner as Examples 3 and 4. In addition, FIG. 22 illustrates pieces of task information stored in progress degree information storage units 3240 of the computers c1 and c2 in the same manner as Example 4. Thus, in the present example, a predicted value or a result value of a task completion time is used as a value representing a processing speed of a task in the same manner as Example 4.

FIG. 30 is a diagram illustrating progress history information stored in a history management unit 3140. Here, T'1 to T'6 denote progress history information regarding a task which was executed in the past. In the present example, the progress history information has an abnormality flag. The abnormality flag represents whether or not the abnormality determination unit 2080 determines that a processing speed is abnormal with respect to a task indicated by the progress history information. For example, in a sixth record of FIG. 30, a value of an abnormality flag is true. This record represents that it is determined that a processing speed is abnormal with respect to the task T'6.

The target range determination unit 2040 determines a target range using a transition of the number of jobs indicated by allocation information. In the present example, the number of jobs transitions from 1 to 2 at 1:29:01. Thus, the target range determination unit 2040 sets the starting time point of the target range to 1:29:01. Accordingly, pieces of progress history information included in the target range are pieces of progress history information regarding the tasks T'4 to T'6 and tasks T1 to T4.

Next, a distribution calculation unit 2060 calculates a task speed distribution using progress history information other than progress history information regarding tasks for which the abnormality determination unit 2080 determines that a processing speed is abnormal, among the pieces of progress history information regarding the tasks T'4 to T'6 and the tasks T1 to T4. Specifically, the distribution calculation unit 2060 uses the pieces of progress history information regarding the tasks other than the task T'6 among the pieces of progress history information included in the target range.

Figure 31:
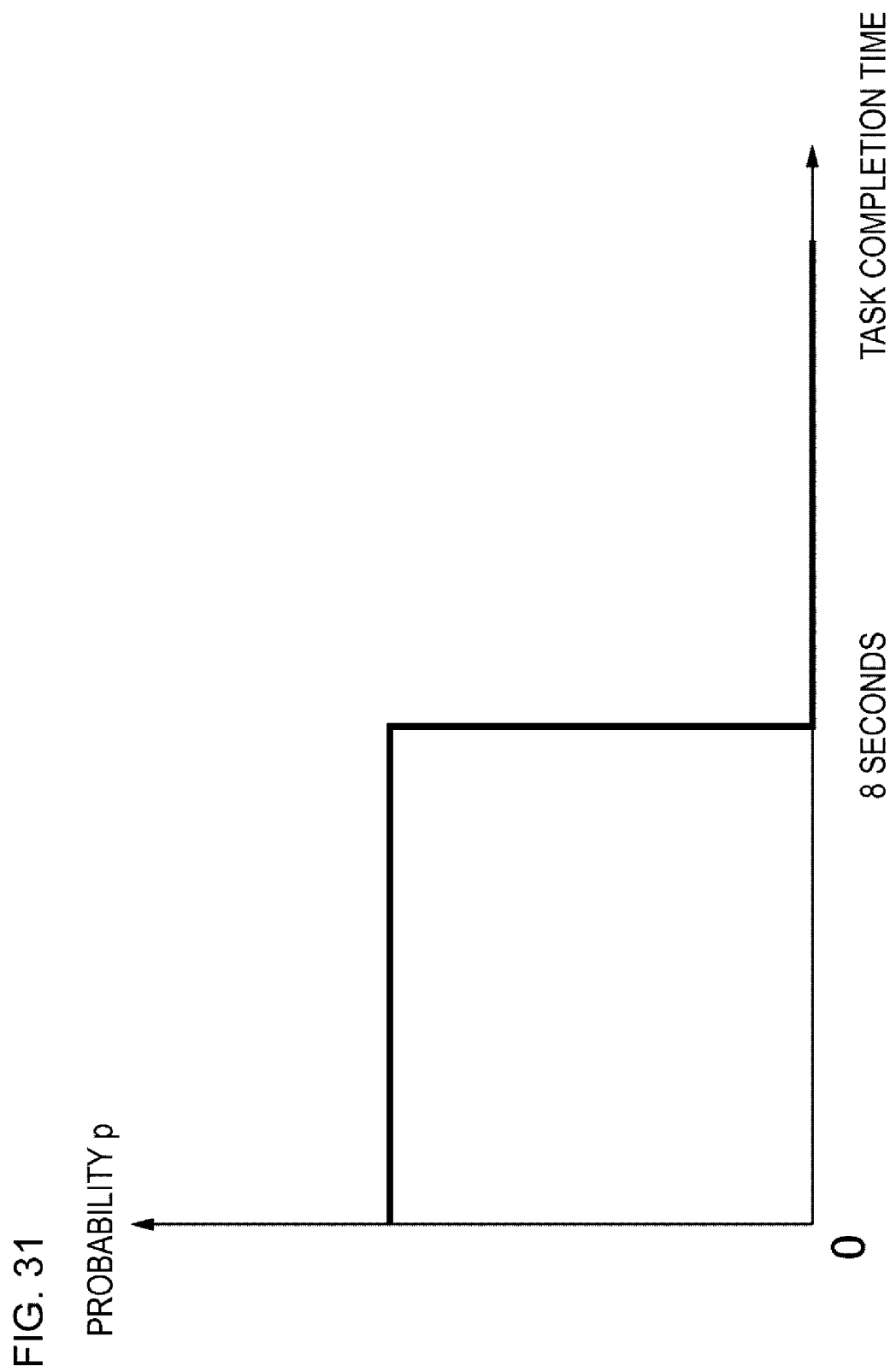
FIG. 31 is a graph illustrating a task speed distribution which is calculated by a distribution calculation unit.

In the present example, the distribution calculation unit 2060 calculates a task speed distribution using the model shown in Example 1. Here, the relation of $\alpha=2$ is set. A maximum processing speed Vm (minimum task completion time) is a task completion time of T'5 (4 seconds). Accordingly, a threshold value D is $\alpha \cdot Vm=8$ seconds. The distribution calculation unit 2060 calculates a probability distribution as a task speed distribution where an occurrence probability of a task having a predicted completion time between [0 seconds, 8 seconds] is set to 1 and an occurrence probability of a task having a predicted completion time between [8 seconds, +∞] is set to 0. FIG. 31 illustrates the task speed distribution calculated by the distribution calculation unit 2060.

The abnormality determination unit 2080 handles each of the tasks T1 to T4 in execution as a target task, compares each of the tasks with the task speed distribution, and determines whether or not a processing speed is abnormal. Note that, it is assumed that the processing speeds of the respective tasks at the current time point (predicted completion times) are represented by the records 7 to 10 of FIG. 30. Only the processing speed of the task T1 among the tasks T1 to T4 is a speed with an occurrence probability of 0 in the task speed distribution. Accordingly, the abnormality determination unit 2080 determines that the processing speed of the task T1 is abnormal.

An execution control unit 2100 transmits an instruction for controlling the execution of the task T1 to an execution management unit 3120. The execution management unit 3120 having received the instruction controls the execution of the task T1. For example, the execution management unit 3120 restarts the task T1 on a process P1.

As described above, the exemplary embodiments of the present invention have been described with reference to the drawings. However, these are merely illustrative of the invention, and a combination of the above-described exemplary embodiments and various configurations other than the above-described exemplary embodiments can also be adopted.

Hereinafter, an example of a reference configuration will be added.

1. An abnormality detection apparatus handling tasks allocated to a plurality of servers as processing targets in a distribution system having the plurality of servers, the abnormality detection apparatus including:
a history acquisition unit acquiring progress history information regarding progress of the plurality of tasks at each of a plurality of time point of recording;
a target range determination unit determining a target range;
a distribution calculation unit calculating a task speed distribution using only the progress history information the time point of recording of which is included in the target range among the progress history information acquired by the history acquisition unit, the task speed distribution being a probability distribution of processing speeds of the tasks; and
an abnormality determination unit determining whether or not a processing speed of a target task is abnormal by comparing a processing speed of the target task with the task speed distribution.

2. The abnormality detection apparatus according to 1, further including an execution control unit restarting the target task on a first server to which the target task is allocated or allocating a task obtained by duplicating the target task to a second server different from the first server, when the abnormality determination unit determines that the processing speed of the target task is abnormal.

3. The abnormality detection apparatus according to 1 or 2, further including a predetermined period acquisition unit acquiring a predetermined period,
wherein the target range determination unit sets the predetermined period as a length of the target range.

4. The abnormality detection apparatus according to 1 or 2, further including an allocation information acquisition unit acquiring allocation information that indicates association between the server and the task allocated to the server,
wherein the target range determination unit sets a time point at which allocation of the task to any of the servers changes as a starting time point of the target range.

5. The abnormality detection apparatus according to 1 or 2, further including a representative value calculation unit calculating, with respect to each of a plurality of periods, a representative value of the processing speed of the task in each of the periods using progress history information the time point of recording of which is included in each of the periods,
wherein the target range determination unit determines the target range so that the target range includes only a period in which there is no significant difference between the representative value of the period and the representative value in a period closest to a current time point, among the periods.

6. The abnormality detection apparatus according to any-one of 1 to 5, further including a type acquisition unit acquiring a task type corresponding to the task,
wherein the distribution calculation unit calculates the task speed distribution using only the progress history information regarding the task corresponding to the task type that is a same as the target task.

7. The abnormality detection apparatus according to 6, wherein the target range determination unit calculates the target range on the basis of the task type corresponding to the target task.

8. The abnormality detection apparatus according to any one of 1 to 7,
wherein the progress history information is stored in a history storage unit,
wherein the history acquisition unit acquires the progress history information from the history storage unit, and
wherein the abnormality detection apparatus further comprises a history deletion unit deleting from the history storage unit the progress history information that is not included in the target range.

9. The abnormality detection apparatus according to any one of 1 to 8, wherein the distribution calculation unit does not use progress history information regarding the target task for which the abnormality determination unit determines that a processing speed is abnormal, for calculation of the task speed distribution on or after the determination.

10. A control method executed by a computer that handles tasks allocated to a plurality of servers as processing targets in a distribution system having the plurality of the servers, the method including:
a history acquisition step of acquiring progress history information regarding progress of the plurality of tasks at each of a plurality of time points of recording;
a target range determination step of determining a target range;
a distribution calculation step of calculating a task speed distribution using only the progress history information the time point of recording of which is included in the target range among the progress history information acquired by the history acquisition step, the task speed distribution being a probability distribution of processing speeds of the tasks; and an abnormality determination step of determining whether or not a processing speed of a target task is abnormal by comparing a processing speed of the target task with the task speed distribution.

11. The control method according to 10, further including an execution control step of restarting the target task on a first server to which the target task is allocated or allocating a task obtained by duplicating the target task to a second server different from the first server, when it is determined in the abnormality determination step that the processing speed of the target task is abnormal.

12. The control method according to 10 or 11, further including a predetermined period acquisition step of acquiring a predetermined period,
wherein the target range determination step sets the predetermined period as a length of the target range.

13. The control method according to 10 or 11, further including an allocation information acquisition step of acquiring allocation information that indicates association between the server and the task allocated to the server,
wherein the target range determination step sets a time point at which allocation of the task to any of the servers changes as a starting time point of the target range.

14. The control method according to 10 or 11, further including a representative value calculation step of calculating, with respect to each of a plurality of periods, a representative value of the processing speed of the task in each of the periods using progress history information the time point of recording of which is included in each of the periods,
wherein the target range determination step determines the target range so that the target range includes only a period in which there is no significant difference between the representative value of the period and the representative value in a period closest to a current time point, among the periods.

15. The control method according to any one of 10 to 14, further including a type acquisition step of acquiring a task type corresponding to the task,
wherein the distribution calculation step calculates the task speed distribution using only the progress history information regarding the task corresponding to the task type that is a same as the target task.

16. The control method according to 15, wherein the target range determination step calculates the target range on the basis of the task type corresponding to the target task.

17. The control method according to any one of 10 to 16, wherein the progress history information is stored in a history storage unit,
wherein the history acquisition step acquires the progress history information from the history storage unit, and
wherein the control method further comprises a history deletion step of deleting from the history storage unit the progress history information that is not included in the target range.

18. The control method according to any one of 10 to 17, wherein the distribution calculation step does not use progress history information regarding the target task for which the abnormality determination step determines that a processing speed is abnormal, for calculation of the task speed distribution on or after the determination.

19. A program causing a computer to have a function of operating as an abnormality detection apparatus that handles tasks allocated to a plurality of servers as processing targets in a distribution system constituted having the plurality of the servers, the program causing the computer to further have:
a history acquisition function of acquiring progress history information regarding progress of the plurality of tasks at each of a plurality of time points of recording;
a target range determination function of determining a target range;
a distribution calculation function of calculating a task speed distribution using only the progress history information the time point of recording of which is included in the target range among the progress history information acquired by the history acquisition function, the task speed distribution being a probability distribution of processing speeds of the tasks; and
an abnormality determination function of determining whether or not a processing speed of a target task is abnormal by comparing a processing speed of the target task with the task speed distribution.

20. The program according to 19, further including an execution control function of restarting the target task on a first server to which the target task is allocated or allocating a task obtained by duplicating the target task to a second server different from the first server, when it is determined by the abnormality determination function that the processing speed of the target task is abnormal.

21. The program according to 19 or 20, causing the computer to further have a predetermined period acquisition function of acquiring a predetermined period,
wherein the target range determination function sets the predetermined period as a length of the target range.

22. The program according to 19 or 20, causing the computer to further have an allocation information acquisition function of acquiring allocation information that indicates association between the server and the task allocated to the server,
wherein the target range determination function sets a time point at which allocation of the task to any of the servers changes as a starting time point of the target range.

23. The program according to 19 or 20, causing the computer to further have a representative value calculation function of calculating, with respect to each of a plurality of periods, a representative value of the processing speed of the task in each of the periods using progress history information the time point of recording of which is included in each of the periods,
wherein the target range determination function determines the target range so that the target range includes only a period in which there is no significant difference between the representative value of the period and the representative value in a period closest to a current time point, among the periods.

24. The program according to anyone of 19 to 23, causing the computer to further have a type acquisition step of acquiring a task type corresponding to the task,
wherein the distribution calculation function calculates the task speed distribution using only the progress history information regarding the task corresponding to the task type that is a same as the target task.

25. The program according to 24, wherein the target range determination function calculates the target range on the basis of the task type corresponding to the target task.

26. The program according to anyone of 19 to 25,
wherein the progress history information is stored in a history storage unit,
wherein the history acquisition function acquires the progress history information from the history storage unit, and
wherein the program causing the computer to further have a history deletion function of deleting from the history storage unit the progress history information that is not included in the target range.

27. The program according to anyone of 19 to 26, wherein the distribution calculation function does not use progress history information regarding the target task for which the abnormality determination step determines that a processing speed is abnormal, for calculation of the task speed distribution on or after the determination.

This application claims priority from Japanese Patent Application No. 2013-136427 filed on Jun. 28, 2013, the content of which is incorporated herein by reference in its entirety.

What is claimed is:

1. An abnormality detection apparatus handling tasks allocated to a plurality of servers as processing targets in a distribution system having a plurality of servers, the abnormality detection apparatus including:
hardware, including a processor;
a history acquisition unit implemented at least by the hardware and acquiring progress history information regarding progress of the plurality of tasks at each of a plurality of time points of recording;
a target range determination unit implemented at least by the hardware and determining a target range;
a distribution calculation unit implemented at least by the hardware and calculating a task speed distribution using only the progress history information the time point of recording of which is included in the target range among the progress history information acquired by the history acquisition unit, the task speed distribution being a probability distribution of processing speeds of the tasks;
an abnormality determination unit implemented at least by the hardware and determining whether or not a processing speed of a target task is abnormal by comparing a processing speed of the target task with the task speed distribution, and
an execution control unit implemented at least by the hardware and performing: restarting the target task on the server to which the target task has been allocated when the processing speed of the target task is determined to be abnormal; or duplicating the target task and allocating the duplicated task to one of the plurality of servers other than the server to which the target task has been allocated when the processing speed of the target task is determined to be abnormal.

2. The abnormality detection apparatus according to claim 1, further including a predetermined period acquisition unit acquiring a predetermined period,
wherein the target range determination unit sets the predetermined period as a length of the target range.

3. The abnormality detection apparatus according to claim 1, further including an allocation information acquisition unit acquiring allocation information that indicates association between the server and the task allocated to the server,
wherein the target range determination unit sets a time point at which allocation of the task to any of the servers changes as a starting time point of the target range.

4. The abnormality detection apparatus according to claim 1, further including a representative value calculation unit calculating, with respect to each of a plurality of periods, a representative value of the processing speed of the task in each of the periods using progress history information the time point of recording of which is included in each of the periods,
wherein the target range determination unit determines the target range so that the target range includes only a period in which there is no significant difference between the representative value of the period and the representative value in a period closest to a current time point, among the periods.

5. The abnormality detection apparatus according to claim 1, further including a type acquisition unit acquiring a task type corresponding to the task,
wherein the distribution calculation unit calculates the task speed distribution using only the progress history information regarding the task corresponding to the task type that is a same as the target task.

6. The abnormality detection apparatus according to claim 5, wherein the target range determination unit calculates the target range on the basis of the task type corresponding to the target task.

7. The abnormality detection apparatus according to claim 1,
wherein the progress history information is stored in a history storage unit,
wherein the history acquisition unit acquires the progress history information from the history storage unit, and
wherein the abnormality detection apparatus further comprises a history deletion unit deleting from the history storage unit the progress history information that is not included in the target range.

8. The abnormality detection apparatus according to claim 1, wherein the distribution calculation unit does not use progress history information regarding the target task for which the abnormality determination unit determines that a processing speed is abnormal, for calculation of the task speed distribution on or after the determination.

9. A control method executed by a computer that handles tasks allocated to a plurality of servers as processing targets in a distribution system having the plurality of the servers, the method including executing:
acquiring progress history information regarding progress of the plurality of tasks at each of a plurality of time points of recording;
determining a target range;
calculating a task speed distribution using only the progress history information the time point of recording of which is included in the target range among the progress history information acquired by the step of acquiring progress history information, the task speed distribution being a probability distribution of processing speeds of the tasks;
determining whether or not a processing speed of a target task is abnormal by comparing a processing speed of the target task with the task speed distribution, and
when the processing speed of the target task is determined to be abnormal, performing: restarting the target task on the server to which the target task has been allocated when the processing speed of the target task is determined to be abnormal; or duplicating the target task and allocating the duplicated task to one of the plurality of servers other than the server to which the target task has been allocated.

10. A non-transitory computer readable storage medium storing a program causing a computer to have a function of operating as an abnormality detection apparatus that handles tasks allocated to a plurality of servers as processing targets in a distribution system constituted having the plurality of the servers, the program causing the computer to execute:
acquiring progress history information regarding progress of the plurality of tasks at each of a plurality of time points of recording;
determining a target range;

calculating a task speed distribution using only the progress history information the time point of recording of which is included in the target range among the progress history information acquired by the step of acquiring progress history information, the task speed distribution being a probability distribution of processing speeds of the tasks;

determining whether or not a processing speed of a target task is abnormal by comparing a processing speed of the target task with the task speed distribution, and when the processing speed of the target task is determined to be abnormal, performing: restarting the target task on the server to which the target task has been allocated when the processing speed of the target task is determined to be abnormal; or duplicating the target task and allocating the duplicated task to one of the plurality of servers other than the server to which the target task has been allocated.

\* \* \* \* \*